United States Patent
Xu et al.

(10) Patent No.: US 11,582,824 B2
(45) Date of Patent: *Feb. 14, 2023

(54) METHOD FOR UE CONTEXT AND UE CONNECTION RESUME

(71) Applicant: Samsung Electronics Co., Ltd., Suwon-si (KR)

(72) Inventors: Lixiang Xu, Beijing (CN); Hong Wang, Beijing (CN); Xiaowan Ke, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/228,570

(22) Filed: Apr. 12, 2021

(65) Prior Publication Data

US 2021/0235533 A1 Jul. 29, 2021

Related U.S. Application Data

(63) Continuation of application No. 16/068,887, filed as application No. PCT/KR2017/000114 on Jan. 4, 2017, now Pat. No. 10,980,076.

(51) Int. Cl.
*H04W 76/19* (2018.01)
*H04W 76/10* (2018.01)
(Continued)

(52) U.S. Cl.
CPC .......... *H04W 76/19* (2018.02); *H04W 76/10* (2018.02); *H04W 76/20* (2018.02); *H04W 76/27* (2018.02); *H04W 84/042* (2013.01)

(58) Field of Classification Search
CPC ..... H04W 76/19; H04W 76/20; H04W 76/10; H04W 76/27; H04W 84/042
(Continued)

(56) References Cited

U.S. PATENT DOCUMENTS

2012/0282956 A1  11/2012  Kim et al.
2013/0100895 A1  4/2013   Aghili et al.
(Continued)

FOREIGN PATENT DOCUMENTS

CN  101494848 A  7/2009
CN  102958194 A  3/2013
(Continued)

OTHER PUBLICATIONS

International Search Report dated Apr. 24, 2017 in connection with International Patent Application No. PCT/KR2017/000114.
(Continued)

*Primary Examiner* — Gbemileke J Onamuti

(57) ABSTRACT

The present disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. The present disclosure provides a method for controlling a user equipment (UE) context and a UE connection, which includes: a first node obtains resume requirement information of a UE; the first node determines whether to resume the UE context, and/or, the UE connection, based on the resume requirement information of the UE. The present disclosure also provides a device for controlling UE context and UE connection.

15 Claims, 14 Drawing Sheets

(51) Int. Cl.
 *H04W 76/20* (2018.01)
 *H04W 76/27* (2018.01)
 *H04W 84/04* (2009.01)

(58) Field of Classification Search
 USPC .......................................................... 370/328
 See application file for complete search history.

(56) References Cited

U.S. PATENT DOCUMENTS

| | | |
|---|---|---|
| 2013/0260810 A1 | 10/2013 | Rayavarapu |
| 2014/0155074 A1 | 6/2014 | Xu |
| 2014/0242962 A1 | 8/2014 | Choi et al. |
| 2014/0269632 A1 | 9/2014 | Blankenship |
| 2014/0313889 A1 | 10/2014 | Jeong et al. |
| 2015/0009816 A1 | 1/2015 | Hsu et al. |
| 2015/0055530 A1 | 2/2015 | Yamauchi |
| 2015/0092665 A1 | 4/2015 | Choi et al. |
| 2015/0201455 A1 | 7/2015 | Redding et al. |
| 2015/0334622 A1 | 11/2015 | Baboescu et al. |
| 2016/0249193 A1 | 8/2016 | Edge et al. |
| 2019/0014530 A1 | 1/2019 | Aghili et al. |

FOREIGN PATENT DOCUMENTS

| | | |
|---|---|---|
| EP | 2645804 A1 | 10/2013 |
| KR | 10-2014-0125883 A | 10/2014 |
| WO | 2011/119680 A2 | 9/2011 |
| WO | 2013/023975 A1 | 2/2013 |

OTHER PUBLICATIONS

Written Opinion of the International Searching Authority dated Apr. 24, 2017 in connection with International Patent Application No. PCT/KR2017/000114.

Extended European Search Report regarding Application No. 17736096.3, dated Nov. 26, 2018, 12 pages.

"3rd Generation Partnership Project; Technical Specification Group Services and System Aspects; Architecture enhancements for Cellular Internet of Things (Release 13)", Technical Report 3GPP TR 23.720 V1.1.0, Oct. 2015, 90 pages.

Communication pursuant to Article 94(3) EPC dated Nov. 6, 2020 in connection with European Application No. 17736096.3, 7 pages.

Office Action dated Oct. 9, 2021, in connection with Chinese Application No. 201610013623.1, 19 pages.

METHOD FOR UE CONTEXT AND UE CONNECTION RESUME

CROSS-REFERENCE TO RELATED APPLICATIONS

This application is a continuation of U.S. patent application Ser. No. 16/068,887 filed on Jul. 9, 2018, which is a 371 of International Application No. PCT/KR2017/000114 filed Jan. 4, 2017, which claims priority to Chinese Patent Application No. 201610013623.1 filed on Jan. 8, 2016, the disclosures of which are herein incorporated by reference in their entirety.

BACKGROUND

1. Field

The present disclosure relates to wireless communication technologies, and more particularly, to a method and device for controlling a User Equipment (UE) context and UE connection.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Modern mobile communication increasingly tends to provide users with high-speed transmission of multimedia services, as shown in FIG. 1, which is a system architecture diagram of system architecture evolution (SAE), wherein:

UE 101 is a terminal device supporting network protocol. Evolved Universal Terrestrial Radio Access Network (E-UTRAN) 102 is a wireless access network, which includes an evolved NodeB (eNB)/NodeB providing a wireless network interface for the UE. Mobility management entity (MME) 103 is responsible for managing mobile context, session context and security information about the UE. Serving Gateway (SGW) 104 mainly provides user plane function. The MME 103 and the SGW 104 may be in the same physical entity. Packet Data Network Gateway (PGW) 105 is responsible for billing, lawful interception and other functions. The PGW 105 and the SGW 104 may be in the same physical entity. Policy and charging rules function (PCRF) entity 106 provides quality of service (QoS) policy and charging standards. Serving General Packet Radio Service Support Node (SGSN) 108 is a network node device in the Universal Mobile Telecommunications System (UMTS) to provide routing for transmitting data. Home Subscriber Server (HSS) 109 is the UE's home subsystem, and is responsible for protecting the user information, such as the current location of the UE, address of a service node, user security information, packet data context of the UE and so on.

SUMMARY

Currently or in the foreseeable future, more and more electrical equipment will become intelligentized, and living peripheral products will become interconnected, both of which have the function of access to the network. These UEs in the Internet generally possess the following characteristics: static or low mobility, low cost, generally receiving and transmitting a small amount of non-continuous data. For these UEs, signaling overheads used when establishing and releasing connections are far greater than the amount of data received and transmitted. To save signaling overheads, improve the efficiency of data transfer, there are still many problems to be solved in the existing networks.

In view of above, the present disclosure provides several methods and equipment for controlling UE context and UE connection, in order to effectively reduce overheads of signaling resources, and improve resource utilization.

The present disclosure provides a method for controlling a UE context and a UE connection, including:

obtaining, by a first node, resume requirement information of a UE; and, determining, by the first node, whether to resume the UE context, and/or, the UE connection, based on the resume requirement information of the UE.

Preferably, when the first node is a control node in a core network (CN), obtaining by the first node the resume requirement information of the UE includes:

obtaining, by the control node in the CN, the resume requirement information of the UE by using at least one of the UE, an evolved Node B (eNB) or a gateway node in the CN;

wherein the method further includes:

when determining to resume the UE context, and/or, the UE connection, transmitting, by the control node in the CN, resume instruction information associated with the UE to the UE, the eNB and at least one node among multiple control nodes in the CN except for the control node in the CN.

Preferably, when the first node is an eNB, obtaining by the first node the resume requirement information of the UE includes:

obtaining, by the eNB, the resume requirement information of the UE from the UE, and/or, a control node in a CN;

wherein the method further includes:

when determining to resume the UE context, and/or, the UE connection, transmitting, by the eNB, the resume requirement information of the UE, or resume instruction information associated with the UE to the UE, and/or, the control node in the CN.

Preferably, when the first node is the UE, obtaining by the first node the resume requirement information of the UE includes:

obtaining, by the UE, the resume requirement information of the UE from at least one of an upper layer of the UE, an eNB, a control node in a CN, or a gateway node in the CN wherein the method further includes:

when determining to resume the UE context, and/or, the UE connection, transmitting, by the UE, the resume requirement information of the UE, or resume instruction information associated with the UE, to the eNB, and/or, the control node in the CN.

Preferably, the resume requirement information of the UE includes at least one of: transmitting requirement information of UE data, a first UE identity, a second UE identity, UE-context resume request information, or UE-connection resume request information.

Preferably, the transmission requirement information of the UE data includes at least one of:

control-plane data transmission requirement information, user-plane data transmission requirement information, a data packet of a control plane, a data packet of a user plane, UE bearer information, a reason for establishing a radio resource control (RRC); and/or, wherein the first UE identity is to index the suspended UE context, the second UE identity is to index the UE context to be established, the first UE identity and the second UE identity include at least one of: cell-radio network temporary identifier (C-RNTI), serving-temporary mobile subscriber identity (S-TMSI), international mobile subscriber identification number (IMSI), temporary mobile subscriber identity (TMSI), resume ID, mobility management entity (MME) UE S1 application protocol (AP) ID, eNB UE S1 AP ID, or globally unique temporary UE identity (GUTI); and/or, wherein the UE-context resume request information includes at least one of:

requesting to establish the UE context, or requesting not to establish the UE context;

requesting to resume, or requesting not to resume the UE context on the UE, on the eNB, on the control node in the CN, or on the gateway node in the CN;

requesting to resume, or requesting not to resume UE bearer context on the UE, on the eNB, on the control node in the CN, or on the gateway node in the CN;

requesting to resume, or requesting not to resume a designated UE bearer context and UE bearer information, wherein the UE bearer information is to index the suspended UE bearer context; and/or, wherein the UE-connection resume request information includes at least one of: requesting to resume, or requesting not to resume a UE connection between the UE and the eNB; requesting to resume, or requesting not to resume the UE connection between the eNB and the control node in the CN;

requesting to resume, or requesting not to resume the UE connection between the eNB and the gateway node in the CN;

requesting to resume, or requesting not to resume the UE connection between the control node in the CN and the gateway node in the CN;

requesting to resume, or requesting not to resume the UE connection between the UE and the control node in the CN;

requesting to resume, or requesting not to resume the UE connection between the UE and the gateway node in the CN;

requesting to resume, or requesting not to resume a user-plane UE connection;

requesting to resume, or requesting not to resume a control-plane UE connection;

requesting to resume, or requesting not to resume all the UE connections;

requesting to resume, or requesting not to resume a designated UE bearer tunnel and UE bearer information, wherein the UE bearer information is to index the suspended UE bearer context.

Preferably, the control-plane data transmission requirement information includes at least one of:

control-plane data transmission requirements;

the control-plane data transmission requirements with subsequent user-plane data transmission requirements, the control-plane data transmission requirements; or, the control-plane data transmission requirements, wherein the data packet of the control plane includes user-plane data;

wherein the user-plane data transmission requirement information includes at least one of:

the user-plane data transmission requirements, the UE bearer information, a data transmission mode, wherein the UE bearer information indicates a UE bearer with data transmission requirements, the data transmission mode indicates whether to transmit through the control plane or the user plane;

wherein the UE bearer information includes at least one of:

a UE bearer identity, a bear's quality of service (QoS) parameter, a transport layer address, a general data transfer platform (GTP) tunnel endpoint identifier (TEID), a non-access stratum (NAS) protocol data unit (PDU), or a correlation ID.

Preferably, the message for carrying the resume requirement information of the UE includes at least one of:

an initial UE message, a resume request message, a UE-context resume request message, a UE-connection resume request message, a UE context modify request, a downlink data notification, an attach request, a tracking area update (TAU) request, a service request.

Preferably, the message for carrying the resume instruction information associated with the UE includes at least one of:

an initial UE context setup request, a downlink NAS transport message, a UE context modify request, a paging message, a resume response, a UE context resume response, a UE context resume reject, a UE connection resume response, a UE connection resume reject, a create bearer request, a modify bearer request, a delete bearer request, an attach accept, an attach reject, a TAU accept, a TAU reject, a service request accept, a service request reject.

Preferably, the resume instruction information associated with the UE includes at least one of:

the transmission requirement information of the UE data, the first UE identity, the second UE identity, UE context resume information, or UE connection resume information.

Preferably, the UE context resume information includes at least one of:

resuming, refusing, not resuming, deactivating or maintaining suspending the UE context;

resuming, refusing, not resuming, deactivating or maintaining suspending a control-plane UE context;

resuming, refusing, not resuming, deactivating or maintaining suspending a user-plane UE context;

resuming, refusing, not resuming, deactivating or maintaining suspending the UE context on the UE, on the eNB, on the control node in the CN, or on the gateway node in the CN;

resuming, refusing, not resuming, deactivating or maintaining suspending the UE bearer contexts on the UE, on the eNB, on the control node in the CN, on the gateway node in the CN;

resuming, refusing, not resuming, deactivating or maintaining suspending the UE bearer information of a specific UE bearer, wherein the UE bearer information is to index the suspended UE bearer context.

Preferably, the connection resume information of the UE includes at least one of:

a reason for refused resume, which includes at least one of: no data transmission requirement, or no user-plane data transmission requirement;

resuming, refusing, not resuming, deactivating or maintaining suspending the UE connection;

resuming, refusing, not resuming, deactivating or maintaining suspending a control-plane UE connection;

resuming, refusing, not resuming, deactivating or maintaining suspending a user-plane UE connection;

resuming, establishing, re-establishing, refusing, not resuming, deactivating, maintaining suspending the UE connection between the UE and the eNB;

resuming, establishing, re-establishing, refusing, not resuming, deactivating, maintaining suspending the UE connection between the eNB and the control node in the CN;

resuming, establishing, re-establishing, refusing, not resuming, deactivating, maintaining suspending the UE connection between the eNB and the gateway node in the CN;

resuming, establishing, re-establishing, refusing, not resuming, deactivating, maintaining suspending the UE connection between the control node in the CN and the gateway node in the CN;

resuming, establishing, re-establishing, refusing, not resuming, deactivating, maintaining suspending the UE connection between the UE and the control node in the CN;

resuming, establishing, re-establishing, refusing, not resuming, deactivating, maintaining suspending the UE connection between the UE and the gateway node in the CN;

resuming, establishing, re-establishing, refusing, not resuming, deactivating, maintaining suspending whether to resume the user-plane UE connection;

resuming, establishing, re-establishing, refusing, not resuming, deactivating, maintaining suspending whether to resume the control-plane UE connection;

resuming, establishing, re-establishing, refusing, not resuming, deactivating, maintaining suspending whether to resume the UE connection;

resuming, establishing, re-establishing, refusing, not resuming, deactivating, maintaining suspending the UE bearer information of a specific UE bearer, wherein the UE bearer information is to index the suspended UE bearer context.

Preferably, determining by the first node whether to resume the UE context and/or UE connection based on the resume requirement information of the UE includes:

resuming, by the first node, the UE context and related UE connection, when the transmission requirement information of the UE data includes at least one of: data transmission requirements, user-plane data transmission requirements, control-plane data transmission requirements with subsequent user-plane data transmission requirements, the data transmission mode is through the user plane; wherein the UE context resumed by the first node includes at least one of: the UE contexts on the UE, on the eNB, on the control node in the CN, on the gateway node in the CN, wherein the UE context on the gateway node in the CN includes the UE bearer context; wherein the related UE connection resumed by the first node includes at least one of: the UE connection between the UE and the eNB, the UE connection between the eNB and the control node in the CN, the UE connection between the eNB and the gateway node in the CN; not resuming, or refusing to resuming, by the first node, the UE context and related UE connection, when the transmission requirement information of the UE data includes: no data transmission requirement; resuming, by the first node, at least one of: the UE contexts of the UE, the control node in the CN, the gateway node in the CN, which include the UE bearer context; the UE context on the eNB, which does not include the UE bearer context; the UE connection between the UE and the eNB, the UE connection between the control node in the CN and the gateway node in the CN; when the transmission requirement information of the UE data includes: the user-plane data transmission requirements and the data transmission mode is through the control plane; resuming, by the first node, the control-plane UE context and the control-plane UE connection; not resuming, or refusing to resume the user-plane UE context or the user-plane UE connection or the UE bearer, when the transmission requirement information of the UE data includes: the control-plane data transmission requirements or without user-plane data transmission requirement; wherein the first node resumes at least one of: the UE contexts on the UE, on the eNB, on the control node in the CN; the UE connection between the UE and the eNB, the UE connection between the eNB and the control node in the CN.

Preferably, the method further includes:

resuming, by the first node, the UE context of UE bearer with data and a tunnel of UE connection of UE bearer with data, based on the UE bearer information in the transmission requirement information of the UE data.

The present disclosure also provides a device for controlling a UE context and UE connection, including an information obtaining module and a determining module, wherein:

the information obtaining module is to obtain resume requirement information of a UE; and, the determining module is to determine whether to resume the UE context, and/or, the UE connection, based on the resume requirement information of the UE.

Based on the foregoing technical solutions, it can be seen that after distinguishing scenarios with different data transmission requirements, UE context or UE connection may be resumed or newly established according to the requirement, thereby effectively reducing overheads of signaling resources, improving resource utilization, and creating favorable conditions for accessing by a huge number of UEs, especially internet of thing (IOT) UEs.

Based on foregoing technical solution, it can be seen that after distinguishing scenarios with different data transmission requirements, resume or newly establish the UE context or UE connection based on requirements, overheads of signaling resource may be effectively reduced. Meanwhile, resource utilization may be improved. And favorable conditions for accessing by a huge number of IOTUEs may be created.

DETAILED DESCRIPTION

Figure 1:
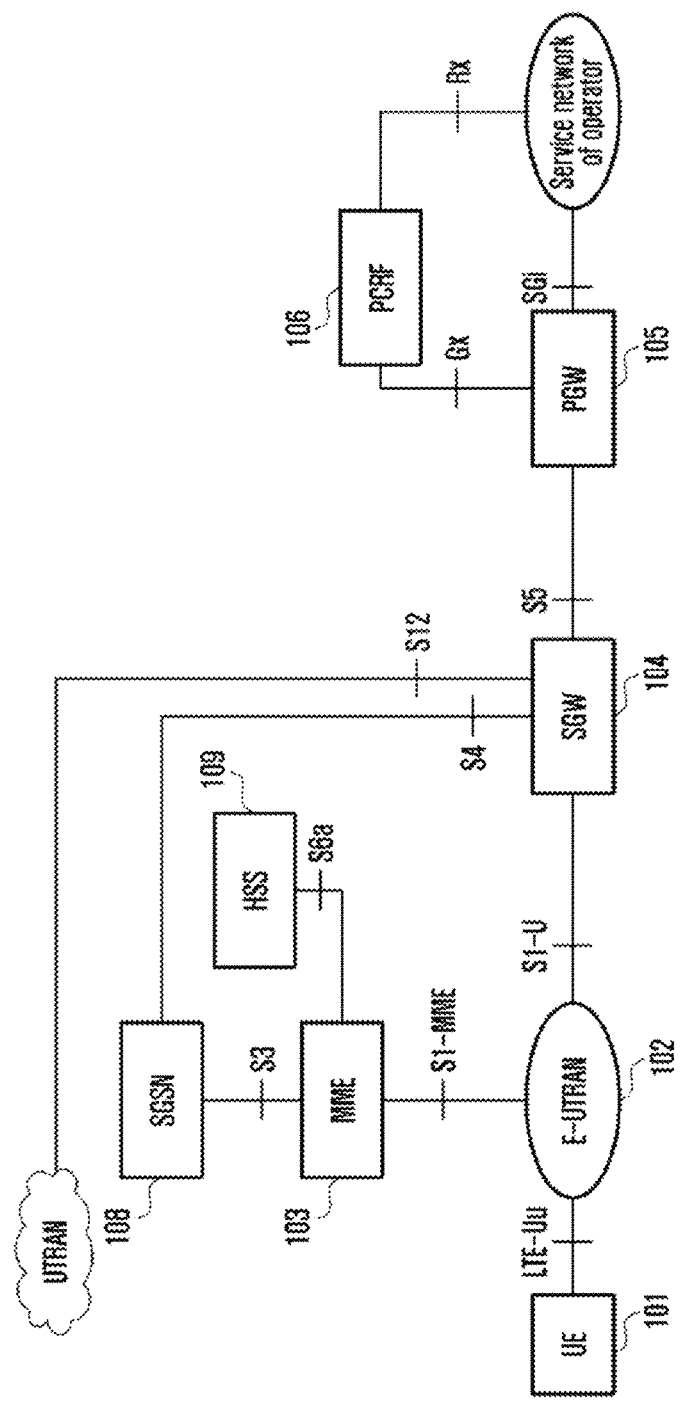
FIG. 1 is a schematic diagram of the existing SAE system architecture.

In order to make objectives, technical solutions and advantages of the present disclosure more clear, the present disclosure is further described in detail accompanying with attached figures and embodiments.

In order to meet requirements of transmitting and receiving small amount of non-continuous data, to save signaling overheads and to improve data transmission efficiency, a solution is put forward in the prior art, in which the UE context is not released when releasing the UE connection. According to this solution, when a UE is disconnected from a network, the UE and the network still save and suspend the UE context, and when the UE accesses the network again, network entities do not need to create and transmit the UE context, and the network does not need to obtain the UE context from the UE. Instead, the network resumes the UE context suspended previously, in order to reduce signaling overheads.

The connection resume or resume UE connection mentioned in various embodiments of the present disclosure may include the following situations:

newly establish, re-establish, activate the UE connection.
activate, resume context about the UE connection.

The connection suspending or suspend connection mentioned in various embodiments of the present disclosure may include the following situations:

delete, deactivate the UE connection.
deactivate, suspend the context about the UE connection.

Non-resume mentioned in various embodiments of the present disclosure may include the following situations:

refuse to resume, keep suspending.

Control node in a core network (CN) mentioned in various embodiments of the present disclosure may include the following situations:

MME, SGSN.

Gateway node in a CN mentioned in various embodiments of the present disclosure may include the following situations:

SGW, Gateway (GW), PGW.

Some basic terms used in this present disclosure will be explained briefly in the following:

The data exchanged between UE and control node in the CN belongs to control plane data.

The UE connection between the eNB and control node in the CN belongs to connection on the UE control plane.

Connection information of the UE control plane belongs to context of the UE control plane.

The data exchanged between UE and gateway node in the CN belongs to user plane data.

The UE connection between the eNB and gateway node in the CN belongs to the UE connection on user plane.

Information/context of UE connection on user plane belongs to UE context of user plane.

There are different UE bearer tunnels on the UE connection of user plane.

UE bearer information/UE context belongs to UE context of user plane.

In general, the data exchanged between the UE and gateway node in the CN requires to establish a UE connection (UE bearer tunnel), which is between the eNB and the gateway node in the CN. The foregoing UE connection is established and released by the control node in the CN.

There are many contents in the UE context, which may vary in different entities. For example, the UE context on the eNB includes, but not limited to the following: UE context of each bearer, capabilities of the UE, UE mobile context, security context, UE identity. The UE context of each bearer includes, but not limited to the following: the UE identity, bearing QoS information of the UE, and the tunnel information of bearer (such as the Internet Protocol (IP) at the eNB's side, tunnel identity, the IP at the gateways side, tunnel identity).

In an embodiment of the present disclosure, the following flow may be used.

The eNB requests the control node (such as MME) in the CN to suspend the UE context (e.g., when the eNB learns that the UE is no longer active, and no data is received or transmitted over a period of time, the eNB requests the control node in the CN to suspend the UE context), and to delete the connection related to the UE.

After receiving the request from the eNB, the control node in the CN requests the gateway node (such as SGW, line gateway (LGW), PGW) in the CN to delete the UE connection (such as S1-U) between the gateway node and the eNB. Subsequently, the control node in the CN suspends UE context, and replies to the request of the eNB.

The eNB then also requires UE to disconnect from the network. The UE and the eNB suspend the UE context respectively.

Subsequently, when the UE has a requirement, the UE requests the eNB to establish or resume the connection, and to resume the UE context (e.g., when the UE needs to transmit and receive data, and the UE is going to access the same eNB; or, the UE receives a paging from the network, which informs the UE that there is data destined for the UE and the UE intends to access the same eNB); after receiving the request from the UE, the eNB requests the control node in the CN to establish the UE connection between the eNB and the CN, and to resume the UE context.

After receiving the request from the eNB, the control node in the CN then resumes the UE context, and requests the gateway node in the CN to establish the UE connection with the eNB.

The UE may request the network to resume the UE context in different scenes. For example, scene 1: the UE needs to transmit and receive user plane data, that is, the UE needs to transmit data to, or receive data from the gateway in the CN via the eNB.

Scene 2: the gateway node in the CN informs the control node in the CN that there is data of the UE. And then, the control node in the CN issues a paging to the UE to receive data.

Scene 3: the UE needs to transmit and receive the control plane data. That is, the UE only needs to communicate with the control node in the CN, such as periodic tracking area update (TAU).

Scene 4: the UE needs to transmit and receive the user plane data. However, the user plane data is transmitted and received through the control plane in the CN, such as non-access stratum protocol data unit (NAS PDU). The control node in the CN forwards the received UE data to the gateway node in the CN. The control node in the CN forwards the received data of the gateway node in the CN to the UE.

As to scene 1 and scene 2, the following contents need to be resumed, in order to meet the communication requirement of the UE: the UE, the eNB, the UE contexts about the control node and gateway node in the CN (especially the UE bearer context needs to be resumed), the UE connection between the UE and the eNB, the UE connection between the eNB and the control node in the CN, and the UE connection between the eNB and the gateway node in the CN.

As to scene 3, the UE does not need to exchange data with the gateway node in the CN through the eNB. Thus, the UE and the network entity are not required to resume the UE bearer context, and also are not required to resume the UE connection (such as S1-U tunnel) between the eNB and the gateway node in the CN. However, the UE and the network entity are required to resume the following contents, so as to meet the communication requirements of the UE: the UE, the eNB, the UE contexts about the control node and gateway node in the CN (not including the UE bearer context), the UE connection between the UE and the eNB, and the UE connection between the eNB and the control node in the CN.

As to scene 4, the UE does not need to exchange data with the gateway node in the CN through the eNB. However, the UE needs to exchange data with the gateway node in the CN through the control node in the CN. Thus, it is not necessary to resume the UE bearer context on the eNB. To implement the communication between the UE and the control node in the CN, it is necessary to resume the following contents: the UE, the UE contexts (including the UE bearer context) on the control node and gateway node in the CN, the UE context on the eNB (not including the UE bearer context), the UE connection between the UE and the eNB, and the UE connection between the control node in the CN and the gateway node in the CN.

For the foregoing scenes, there are following problems at present.

Problem 1): UE-context resume requirements for various entities in different scenes are different from that for the UE connection between various entities. Resource waste and extra access delay may be resulted from resuming each UE context and each UE connection in all cases. When various resume behaviors executed in different scenarios are differentiated, foregoing four scenarios are not differentiated by current UE, the eNB, the control node in the CN, etc.

Problem 2): the UE, the eNB and the control node in the CN do not learn how to index the suspended context.

Problem 3): as to all the scenes, the UE context and UE connection are resumed firstly, and then data is transmitted and received. There is generally one data packet destined for the control node in the CN. Extra signaling overheads may be resulted from transmitting the data packet with signaling after resuming the connection.

Problem 4): user plane of the UE may include multiple bearers. Resource waste may be resulted from resuming all the bearers. In order to save resources, determine to resume a bearer according to data transmission requirements of such bearer.

To solve the foregoing problems, the present disclosure provides various methods. In the various methods, different entities, such as the control node in the CN, the eNB and the UE, may determine resume behaviors of UE contexts of different entities, and resume behaviors of UE connection among different entities.

Figure 2:
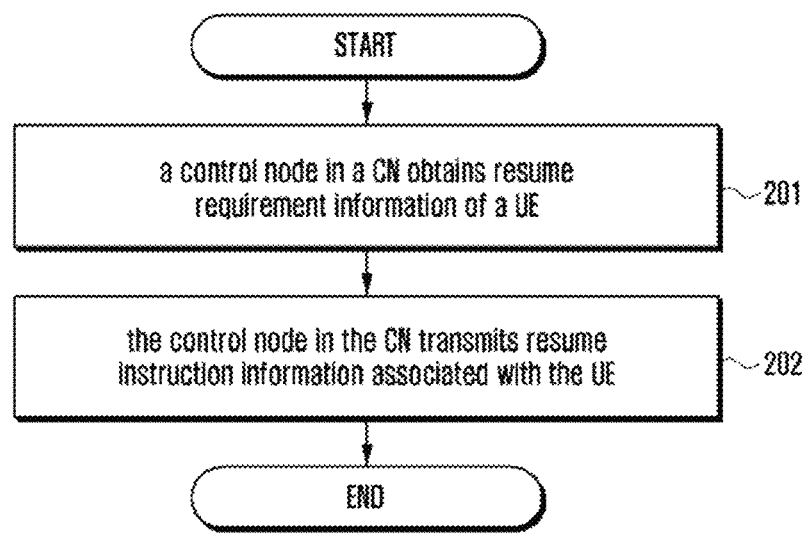
FIG. 2 is a flow chart illustrating a first method for controlling UE context and UE connection, in accordance with an embodiment of the present disclosure.
Figure 3:
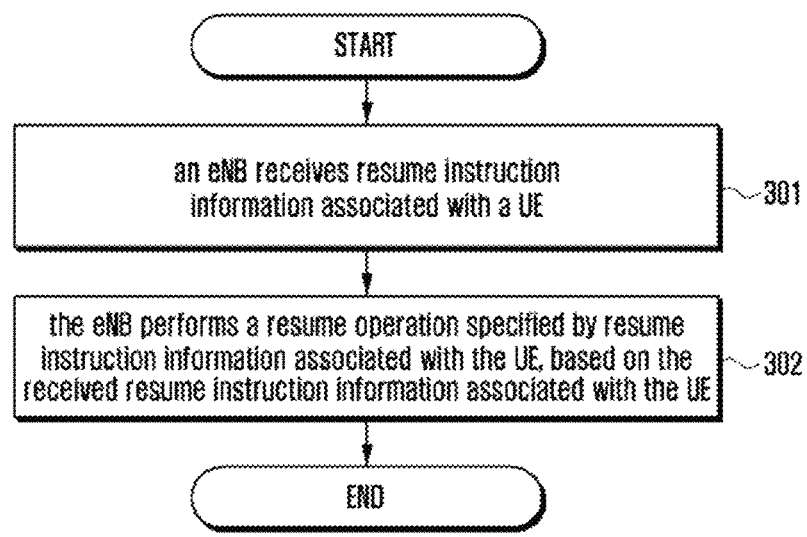
FIG. 3 is a flow chart illustrating a second method for controlling UE context and UE connection, in accordance with an embodiment of the present disclosure.
Figure 4:
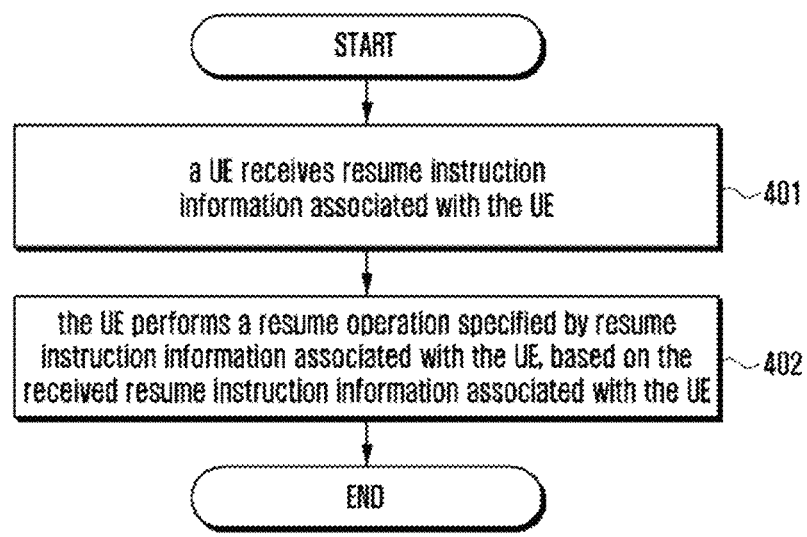
FIG. 4 is a flow chart illustrating a third method for controlling UE context and UE connection, in accordance with an embodiment of the present disclosure.

In FIGS. 2 to 4, the control node in the CN determines resume behaviors of the UE contexts of different entities, and resume behaviors of the UE connection among different entities.

The UE-context resume behavior of different entities and UE-connection resume behavior of different entities are determined by the control node in the CN.

FIG. 2 is a flow chart illustrating a first method for controlling UE context and UE connection, in accordance with an embodiment of the present disclosure. The control node in the CN determines the resume behaviors of the UE context and the UE connection, which may include the following blocks.

In block 201, a control node in a CN obtains resume requirement information of a UE.

Optionally, the control node in the CN may obtain resume requirement information of the UE from the UE, the eNB or the gateway node in the CN.

In some implementations, the resume requirement information of the UE may be carried by, but not limited to, the following messages: an initial UE message, a resume request message, a UE-context resume request message, a UE-connection resume request message, a UE context modify request, a downlink data notification, an attach request, a TAU request, a service request.

In some other implementations, the control node in the CN may obtain the resume requirement information of the UE, by means of receiving different messages. For example, the control node in the CN receives the initial UE message from the eNB, and learns at least one of: 1) it is not necessary to resume the user-plane UE context and the user-plane UE connection; 2) it is necessary to newly establish the UE context and UE connection; 3) only resume the control-plane UE context and control-plane UE connection; by receiving the resume request message from the eNB, the control node in the CN learns that the UE requests to resume the UE context or UE connection; by receiving the downlink data notification from the gateway in the CN, the control node in the CN learns that there is data destined for the UE, and it is necessary to resume the UE context and the UE connection; by receiving the service request, the control node in the CN learns that the UE needs to transmit data, and it is necessary to resume the UE context and the UE connection; the control node in the CN receives from the UE a control plane message, e.g., the attach request, the TAU request, in which the control plane message indicates whether there are subsequent user-plane data transmission requirements; when there is no subsequent user-plane data transmission requirement, it is necessary to resume or newly establish the control-plane UE context and control-plane UE connection, meanwhile it is not necessary to resume the user-plane UE context and user-plane UE connection.

Optionally, the resume requirement information of the UE includes at least one of: transmission requirement information of the UE data, a first UE identity, a second UE identity, resume request information of the UE context, resume request information of the UE connection.

Optionally, the transmission requirement information of the UE data may include at least one of: control-plane data transmission requirement information, user-plane data transmission requirement information, control plane packets (such as NAS PDU), user plane packets, UE bearer information, the reason of radio resource control (RRC) establishment. Based on control plane signaling in the control plane packet, such as whether TAU request includes an active flag identity, the control node in the CN may learn whether there is a data transport request, or whether request to resume the UE connection. The reason of RRC establishment may demonstrate the transmission requirements information of the UE data, e.g., the originating signaling may demonstrate the control-plane data transmission requirements, and originating data represents the user-plane data transmission requirements.

Optionally, the control-plane data transmission requirement information may include at least one of: the control-plane data transmission requirements; the control-plane data transmission requirements with subsequent user-plane data transmission requirements; the control-plane data transmission requirements and a required control-plane data packet includes user plane data. The data transport may be further divided into data transmission and data reception, or uplink data and downlink data. The control-plane transmission requirement may be represented by signaling request of the NAS layer, such as the attach request, the TAU request, and the service request, and so on.

Optionally, the user-plane data transmission requirement information may include at least one of: user-plane data transmission requirements, the UE bearer information, the data transmission mode. The user-plane data transmission requirements may be further divided into uplink user-plane data transmission requirements. The UE bearer information indicates that there is a UE bearer with data transmission requirements. The data transmission mode indicates that the data is transmitted by the control plane (such as NAS PDU) or by user plane (such as the UE bearer).The UE bearer information may include at least one of: UE bearer identity, bearer QoS parameter, transport layer address, General Packet Radio Service tunneling protocol (GTP)-terminal endpoint identifier (TEID), NAS PDU, correlation identifier (ID).

Optionally, the first UE identity may include at least one of: cell radio network temporary identifier (C-RNTI), Serving-Temporary Mobile Subscriber Identity (S-TMSI), International Mobile Subscriber Identification number (IMSI), TMSI, resume ID, MME UE S1 Application Protocol (AP) ID, eNB UE S1AP ID, Globally Unique Temporary UE Identity (GUTI). The first UE identity is used to index the suspended UE context.

Optionally, the contents of the second UE ID are the same as that of the first UE ID, which are not repeated here. The second UE identity is used to index the UE context to be established.

Optionally, the UE-context resume request information may include at least one of:

request to establish or not to establish the UE context;

request to resume or not to resume the UE contexts on the UE, on the eNB, on the control node in the CN, on the gateway node in the CN;

request to resume or not to resume the UE bearer contexts on the UE, on the eNB, on the control node, on the gateway node in the CN;

request to resume or not to resume a specific UE bearer context, UE bearer information. The UE bearer information has already been described above, which is not repeated here. The UE bearer information may be used to index the suspended UE bearer context.

In some implementations, the UE context involved in the UE-context resume request information may be further divided into control-plane UE context and user-plane UE context.

Optionally, the UE-connection resume request information may include at least one of:

request to resume or not to resume the UE connection between the UE and the eNB;

request to resume or not to resume the UE connection between the eNB and the control node in the CN;

request to resume or not to resume the UE connection between the eNB and the gateway node in the CN;

request to resume or not to resume the UE connection between the control node in the CN and the gateway node in the CN;

request to resume or not to resume the UE connection between the UE and the control node in the CN;

request to resume or not to resume the UE connection between the UE and the gateway node in the CN;

request to resume or not to resume the user-plane UE connection;

request to resume or not to resume the control-plane UE connection;

request to resume or not to resume all the UE connections;

request to resume or not to resume a specific UE bearer tunnel and UE bearer information. Here, the "specific" is "designated." The UE bearer information has been described above, which will not be repeated here. The UE bearer information may be used to index the suspended UE bearer context.

In some implementations, the UE connections involved in the resume request information of the UE connection may be further divided into control-plane UE connection and user-plane UE connection.

In some implementations, UE-context resume or UE-connection resume means there are transmission requirements of UE data. The resume of user-plane UE connection or user-plane UE context indicates there are user-plane transmission requirements of the UE data. The resume of control-plane UE connection or control-plane UE context indicates there are control-plane transmission requirements of the UE data.

In some implementations, transmission requirement information of the UE data may indicate that there is a request for resuming the UE context or UE connection. Transmission requirements of the user-plane UE data may indicate there is a request for resuming the user-plane UE connection or the user-plane UE-context. Transmission requirements of the control-plane UE data may indicate that there is a request for resuming the control-plane UE connection or the control-plane UE context.

In block 202, the control node in the CN transmits resume instruction information associated with the UE.

Optionally, the control node in the CN synthetically determines whether to resume the UE context and related UE connections, based on the received resume requirement information of the UE context, and transmits resume instruction information associated with the UE.

Optionally, the control node in the CN transmits resume instruction information associated with the UE to the UE, the eNB, or other control nodes in the CN. The resume instruction information associated with the UE may be carried, but not limited to the following messages: Initial UE Context Setup, NAS downlink transmission, UE context modify, paging message, resume response, UE context resume response, UE context resume reject, UE connection resume response, UE connection resume reject, create bearer request, modify bearer request, delete bearer request, attach accept, attach reject, TAU accept, TAU reject, service request accept, service request reject.

Optionally, the resume instruction information associated with the UE includes at least one of: transmission requirement information of the UE data, a first UE identity, a second UE identity, UE-context resume information, UE-connection resume information.

Optionally, the transmission requirement information of the UE data may be the same as that in block 201, which will not be repeated here.

In some implementations, the control node in the CN may resume the UE context and related UE connections, when the transmission requirement information of the UE data includes at least one of: data transmission requirements, user-plane data transmission requirements, control-plane data transmission requirements with subsequent user-plane data transmission requirements, data transmission mode is through the user plane. In some implementations, the UE context and related UE connections resumed by the control node in the CN may include at least one of: the UE contexts (in particular, the UE bearer context needs to be resumed, the UE bearer context is the same as the UE bearer information in block 201, which is not repeated here) on the UE, on the eNB, on the control node in the CN, on the gateway node in the CN; the UE connection between the UE and the eNB, the UE connection between the eNB and the control node in the CN, the UE connection between the eNB and the gateway node in the CN. Furthermore, the control node in the CN may resume the UE context of UE bearer with data and tunnels of UE connection of UE bearer with data, based on the UE bearer information in the transmission requirement information of the UE data.

In some implementations, when there is no data transmission requirement, the control node in the CN may not resume or refuse to resume the UE context and related UE connections.

In some implementations, when the transmission requirement information of the UE data includes: user-plane data transmission requirements and the data transmission mode is through the control plane, the control node in the CN may perform at least one of: does not resume or refuses to resume the UE connection between the eNB and the gateway node in the CN, does not resume the UE bearer context of the eNB. The control node in the CN may resume at least one of: the UE contexts (including the UE bearer context) of the UE, the control node in the CN, the gateway node in the CN, the UE context (not including the UE bearer context) of the eNB; the UE connection between the UE and the eNB, the UE connection between the control node in the CN and the gateway node in the CN. Furthermore, the control node in the CN may also resume the UE context of UE bearer with data and the tunnel of UE connection of UE bearer with data, according to the UE bearer information in the transmission requirement information of the UE data.

In some implementations, when the transmission requirement information of the UE data satisfies one of the following conditions: there is no user-plane data transmission requirement, there are only the control-plane data transmission requirements, the control node in the CN may only resume the control-plane UE context and the control-plane UE connection. The control node in the CN does not resume or refuse to resume user-plane UE context, or user-plane UE connection or UE bearer. The control node in the CN may resume at least one of: the UE context on the UE, the UE context on the eNB, the UE context on the control node in the CN; the UE connection between the UE and the eNB, the UE connection between the eNB and the control node in the CN.

Optionally, the UE-context resume information may include at least one of:

resume, refuse, not to resume, deactivate or maintain suspending the UE context;

resume, refuse, not to resume, deactivate or maintain suspending the control-plane UE context;

resume, refuse, not to resume, deactivate or maintain suspending the user-plane UE context;

resume, refuse, not to resume, deactivate or maintain suspending the UE contexts on the UE, on the eNB, on the control node in the CN, on the gateway node in the CN;

resume, refuse, not to resume, deactivate or maintain suspending the UE bearer contexts on the UE, on the eNB, on the control node in the CN, on the gateway node in the CN;

resume, refuse, not to resume, deactivate or maintain suspending UE bearer information of a specific UE bearer. The UE bearer information has been described in block 201, which is not repeated here. The UE bearer information may be used to index the suspended UE bearer context.

In some implementations, resume of the UE context may indicate that it is necessary to resume related UE connections. For example, resume of user-plane UE context also indicates it is necessary to resume the user-plane UE connection. Resume of the control-plane UE context also indicates it is necessary to resume the control-plane UE connection.

In some implementations, the UE contexts involved in the UE context resume information are further divided into control-plane UE context and user-plane UE context.

Optionally, the UE-connection resume information may include at least one of:

reasons of refusing resume, which may be at least one of: there is no data transmission requirement, there is no user-plane data transmission requirement;

resume, refuse, not to resume, deactivate or maintain suspending the UE connection;

resume, refuse, not to resume, deactivate or maintain suspending the control-plane UE connection;

resume, refuse, not to resume, deactivate or maintain suspending the user-plane UE connection;

resume, establish, re-establish, refuse, not to resume, deactivate, maintain suspending the UE connection between the UE and the eNB;

resume, establish, re-establish, refuse, not to resume, deactivate, maintain suspending the UE connection between the eNB and the control node in the CN;

resume, establish, re-establish, refuse, not to resume, deactivate, maintain suspending the UE connection between the eNB and the gateway node in the CN;

resume, establish, re-establish, refuse, not to resume, deactivate, maintain suspending the UE connection between the control node in the CN and the gateway node in the CN;

resume, establish, re-establish, refuse, not to resume, deactivate, maintain suspending the UE connection between the UE and the control node in the CN;

resume, establish, re-establish, refuse, not to resume, deactivate, maintain suspending the UE connection between the UE and the gateway node in the CN;

resume, establish, re-establish, refuse, not to resume, deactivate, maintain suspending whether to resume the user-plane UE connection;

resume, establish, re-establish, refuse, not to resume, deactivate, maintain suspending whether to resume the control-plane UE connection;

resume, establish, re-establish, refuse, not to resume, deactivate, maintain suspending whether to resume the UE connection;

resume, establish, re-establish, refuse, not to resume, deactivate, maintain suspending UE bearer information of a specific UE bearer; the UE bearer information has already been described in block 201, which will not be repeated here. The UE bearer information may be used to index the suspended UE bearer context.

In some implementations, the UE connections involved in UE-connection resume information may be further divided into control-plane UE connection and user-plane UE connection.

In some implementations, resume of related UE connections may also indicate that it is necessary to resume related UE context. For example, resume of user-plane UE connection also indicates it is necessary to resume the user-plane UE context. The resume of control-plane UE connection also indicates it is necessary to resume the control-plane UE context.

Optionally, the first UE identity may be used to index the suspended UE context. The contents of the first UE identity may refer to block 201.

Optionally, the second UE identity may be used to index a new UE context. Designation of the second UE identity may indicate to delete the UE context related to the second UE identity. The contents of the second UE identity may refer to block 201.

FIG. 3 is a flow chart illustrating a second method for controlling UE context and UE connection, in accordance with an embodiment of the present disclosure. In the flow chart, based on the UE-context/UE-connection resume instruction information transmitted by the a control node in the a CN, the an eNB establishes/resumes the UE connection, which includes the following blocks.

In block 301, an eNB receives resume instruction information associated with a UE.

Optionally, the eNB may obtain the resume instruction information associated with the UE from the control node in the CN or the UE.

Optionally, the resume instruction information associated with the UE may refer to block 202, which will not be repeated here.

In block 302, based on the received resume instruction information associated with the UE, the eNB performs a resume operation specified by the resume instruction information associated with the UE to at least one of: the UE context, the control-plane UE context, the user-plane UE context, the UE bearer context, the UE connection, the user-plane UE connection, the control-plane UE connection, the UE bearer tunnel of the UE connection. The foregoing resume operation may include at least one of: resume, re-establishment, no resume, deactivation, keeping suspending. Specific operations have already been described in block 202, which are not repeated here.

Optionally, the eNB may forward the resume instruction information associated with the UE to the UE.

Optionally, the eNB may synchronize an operation result for resuming the UE context to the UE.

FIG. 4 is a flow chart illustrating a third method for controlling UE context and UE connection, in accordance with an embodiment of the present disclosure. In the flow chart, based on the received UE-context/UE-connection resume instruction information, the UE establishes/resumes the UE connection, which may include the following blocks.

In block 401, a UE receives resume instruction information associated with the UE.

Optionally, the UE may obtain the resume instruction information associated with the UE from the eNB or control node in the CN.

Optionally, the resume instruction information associated with the UE may refer to block 202, which is not repeated here.

In block 402, based on the received resume instruction information associated with the UE, the UE performs a resume operation specified by the resume instruction information associated with the UE to at least one of: the UE context, the control-plane UE context, the user-plane UE context, the UE bearer context, the UE connection, the user-plane UE connection, the control-plane UE connection, the UE bearer tunnel of the UE connection. The foregoing resume operation may include at least one of: resume, re-establishment, no resume, deactivation, keep suspending. The specific operations have been described in block 202, which are not repeated here.

Figure 5:
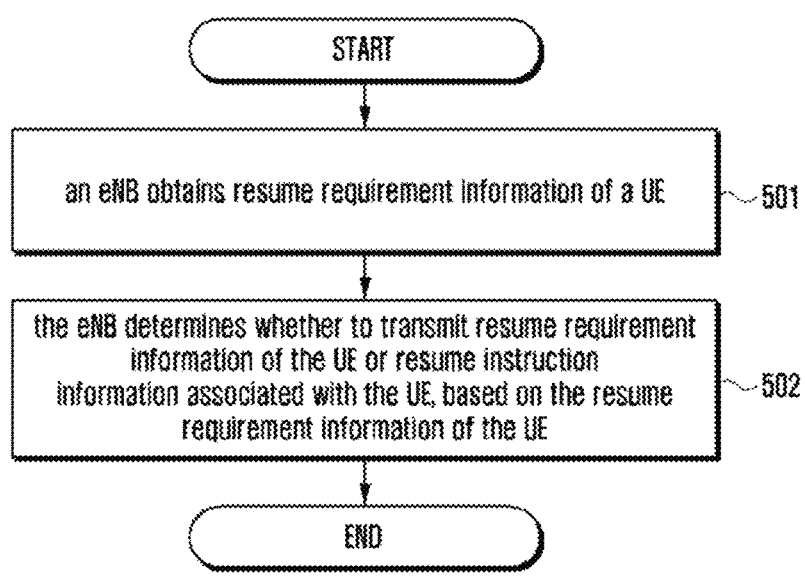
FIG. 5 is a flow chart illustrating a fourth method for controlling UE context and UE connection, in accordance with an embodiment of the present disclosure.

FIG. 5 is a flow chart, in which the eNB determines UE-context resume behavior of different entities, and UE-connection resume behavior of different entities.

FIG. 5 is a flow chart illustrating a fourth method for controlling UE context and UE connection, in accordance with an embodiment of the present disclosure, which may include the following blocks.

In block 501: an eNB obtains resume requirement information of a UE.

Optionally, the resume requirement information of the UE has been described in block 201, which is not repeated here.

Optionally, the eNB may obtain the resume requirement information of the UE from the UE and/or the control node in the CN.

In some implementations, the eNB may obtain resume requirement information of the UE, based on paging information transmitted by the control node in the CN. The eNB can learn whether the UE context is suspended, by using the first UE identity in the resume requirement information of the UE to index. The eNB can also index the suspended UE bearer context, by using the UE bearer information in the resume requirement information of the UE. The eNB can learn there are UE-data transmission requirements from the paging message. When the UE accesses the eNB, the eNB can transmit UE-context/UE-connection resume request to the control node in the CN for the UE, requesting to resume the UE context/UE connection or to resume user-plane UE context/user-plane UE connection. The eNB can transmit resume requirement information of the UE to the control node in the CN, as described in block 201.

In block 502: the eNB determines whether to transmit resume requirement information of the UE or resume instruction information associated with the UE, based on the transmission requirement information of the UE data.

Optionally, the eNB comprehensively determines whether to resume UE context and related UE connections, based on the received resume requirement information of the UE. The specific determination manner is consistent with that described in block 202, which will not be repeated here. The resume requirement information of the UE has been described in block 201.

Optionally, the resume instruction information associated with the UE has been described in block 202. When determining whether to transmit the resume instruction information associated with the UE, based on the transmission requirement information of the UE data, the specific operations performed by the eNB are consistent with that described in block 202, which will not be repeated here.

Optionally, the eNB may transmit the resume requirement information of the UE to the control node in the CN. Based on the request of the eNB, the control node in the CN performs an operation to at least one of the UE context, the control-plane UE context, the user-plane UE context, the UE bearer context, the UE connection, the user-plane UE connection, the control-plane UE connection, the UE bearer tunnel of UE connection. The foregoing operation may include at least one of: resume, re-establishment, no resume, deactivation or keeping suspending. Specific operations have been described in block step 202, which are not repeated here.

In some implementations, the eNB may request the control node in the CN to resume the UE context and related UE connections, when at least one of following conditions is met. There are data transmission requirements; there are user-plane data transmission requirements; there are control-plane data transmission requirements with subsequent user-plane data transmission requirements; the data transmission mode is through the user plane bearer. The eNB requests the control node in the CN to resume the UE context and related UE connections. The foregoing UE context and related UE connections may include at least one of: the UE contexts (especially the UE bearer context needs to be resumed) on the UE, on the eNB, on the control node in the CN, on the gateway node in the CN; the UE connection between the eNB and the UE, the UE associated connection between the eNB and the control node in the CN, the UE connection between the eNB and the gateway node in the CN. Besides, based on the UE bearer identity in the transmission requirement information of the UE data, the control node in the CN may also resume the UE contexts of UE bearer with data, and tunnels of UE connection of UE bearer with data. The UE bearer information is described in block 201. The UE connections may be further divided into control-plane UE connection and user-plane UE connection. The UE contexts may be further divided into control-plane UE context and user-plane UE context.

In some implementations, when there are user-plane data transmission requirements and data transmission mode is through the control plane, the eNB can request the control node in the CN to resume at least one of: the UE contexts (including the UE bearer context) of the UE, the control node in the CN, the gateway node in the CN, the UE context (not including the UE bearer context) of the eNB; the UE connection between the UE and the eNB, the UE connection between the control node in the CN and the gateway node in the CN. Furthermore, based on the UE bearer identity in the transmission requirement information of the UE data, the control node in the CN may also resume the UE contexts of UE bearer with data, and tunnels of UE connection of UE bearer with data. The UE bearer information has been described in block 201. The UE connections may be further divided into control-plane UE connection and user-plane UE connection. The UE contexts may be further divided into control-plane UE context and user-plane UE context.

In some implementation, when there are only control-plane data transmission requirements, the eNB may request the control node in the CN to perform at least one of: 1) transmit a connection establishment request (such as initial UE message), or request to newly establish the UE context; 2) request to resume at least one of: the UE contexts (not including the UE bearer context) on the UE, on the eNB, on the control node in the CN, on the gateway node in the CN; the UE connection between the UE and the eNB, the UE connection between the eNB and the control node in the CN. The UE bearer information has been described in block 201. The UE connections may be further divided into control-plane UE connection and user-plane UE connection. The UE contexts may be further divided into control-plane UE context and user-plane UE context.

Figure 6:
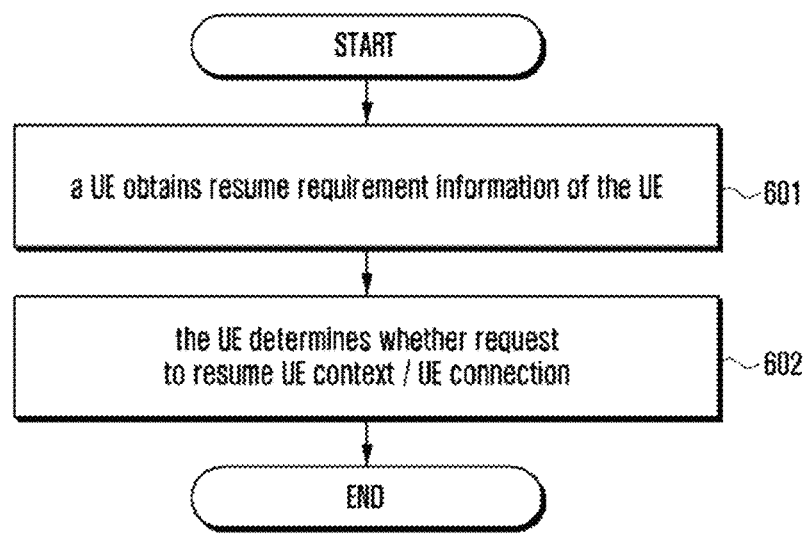
FIG. 6 is a flow chart illustrating a fifth method for controlling UE context and UE connection, in accordance with an embodiment of the present disclosure.

FIG. 6 is a flow chart, in which the UE determines UE-context resume behavior of different entities, and UE-connection resume behavior of different entities.

FIG. 6 is a flow chart illustrating a fifth method for controlling UE context and UE connection, in accordance with an embodiment of the present disclosure, which may include the following blocks.

In block 601, a UE obtains resume requirement information of the UE.

Optionally, the UE may obtain the resume requirement information of the UE from the upper layer of the UE, from the eNB, from the control node in the CN or from the gateway node in the CN.

In some implementation, the UE may obtain resume requirement information of the UE by receiving a paging message. The UE can index the suspended UE context, based on the first UE identity index in the resume requirement information of the UE; or, the UE can index the suspended UE bearer context, based on the UE bearer information in the resume requirement information of the UE. The UE can learn that there are transmission requirements of the UE data with the paging message.

In block 602, the UE determines whether request to resume the UE context/UE connection.

Optionally, the UE may transmit resume requirement information of the UE, or resume instruction information associated with the UE to a network node, such as the eNB or the control node in the CN.

Optionally, the resume requirement information of the UE is described in block 201, which is not repeated here.

Optionally, the resume instruction information associated with the UE is described in block 202, which is not repeated here.

In some implementations, the UE may request the network node to resume UE context and related UE connection, when at least one of the following conditions is met: there are data transmission requirements; there are user-plane data transmission requirements; there are control-plane data transmission requirements with subsequent user-plane data transmission requirements, or data transmission mode is through the user plane. The foregoing UE context and related UE connections may include at least one of: the UE contexts (especially the UE bearer context needs to be resumed) on the UE, on the eNB, on the control node in the CN, on the gateway node in the CN; the UE connection between the eNB and the UE, the UE connection between the eNB and the control node in the CN, the UE connection between the eNB and the gateway node in the CN. Furthermore, based on the UE bearer information in the transmission requirement information of the UE data, the control node in the CN may resume only the UE context of the UE bearer with data, and tunnels of the UE bearer with data in the UE connection. The UE connections may be further divided into control-plane UE connection and user-plane UE connection. The UE contexts may be further divided into control-plane UE context and user-plane UE context.

In some implementations, when there are user-plane data transmission requirements and data transmission mode is through the control plane, the UE can request the control node in the CN to resume at least one of: the UE contexts (including the UE bearer context) on the UE, on the control node in the CN, on the gateway node in the CN; the UE context (not including the UE bearer context) on the eNB; the UE connection between the UE and the eNB, the UE connection between the control node in the CN and the gateway node in the CN. Furthermore, based on the UE bearer information in the transmission requirement information of the UE data, the control node in the CN may only resume the UE contexts of UE bearer with data, and tunnels of UE bearer with data of UE connection. The UE bearer information has been described in block 201. The UE connections may be further divided into control-plane UE connection and user-plane UE connection. The UE contexts may be further divided into control-plane UE context and user-plane UE context.

In some implementations, when there are only control-plane data transmission requirements, the UE may request a network node to perform at least one of: 1) transmit a connection establishment request (such as initial UE message), or request to newly establish the UE context; 2) request to resume at least one of: the UE contexts (not including the UE bearer context) on the UE, on the eNB, on the control node in the CN, on the gateway node in the CN; the UE connection between the UE and the eNB, the UE connection between the eNB and the control node in the CN. Control-plane data transmission requirements may be carried in the initial UE message, or UE-context/UE-connection resume request message.

In some implementations, the eNB may transmit an initial UE message to the control node in the CN, so as to establish a new UE context, based on the received UE connection establishment request message. The eNB may also transmit the UE-context/UE-connection resume request to the control node in the CN, after indexing the UE context with the received UE-connection resume request.

Figure 7:
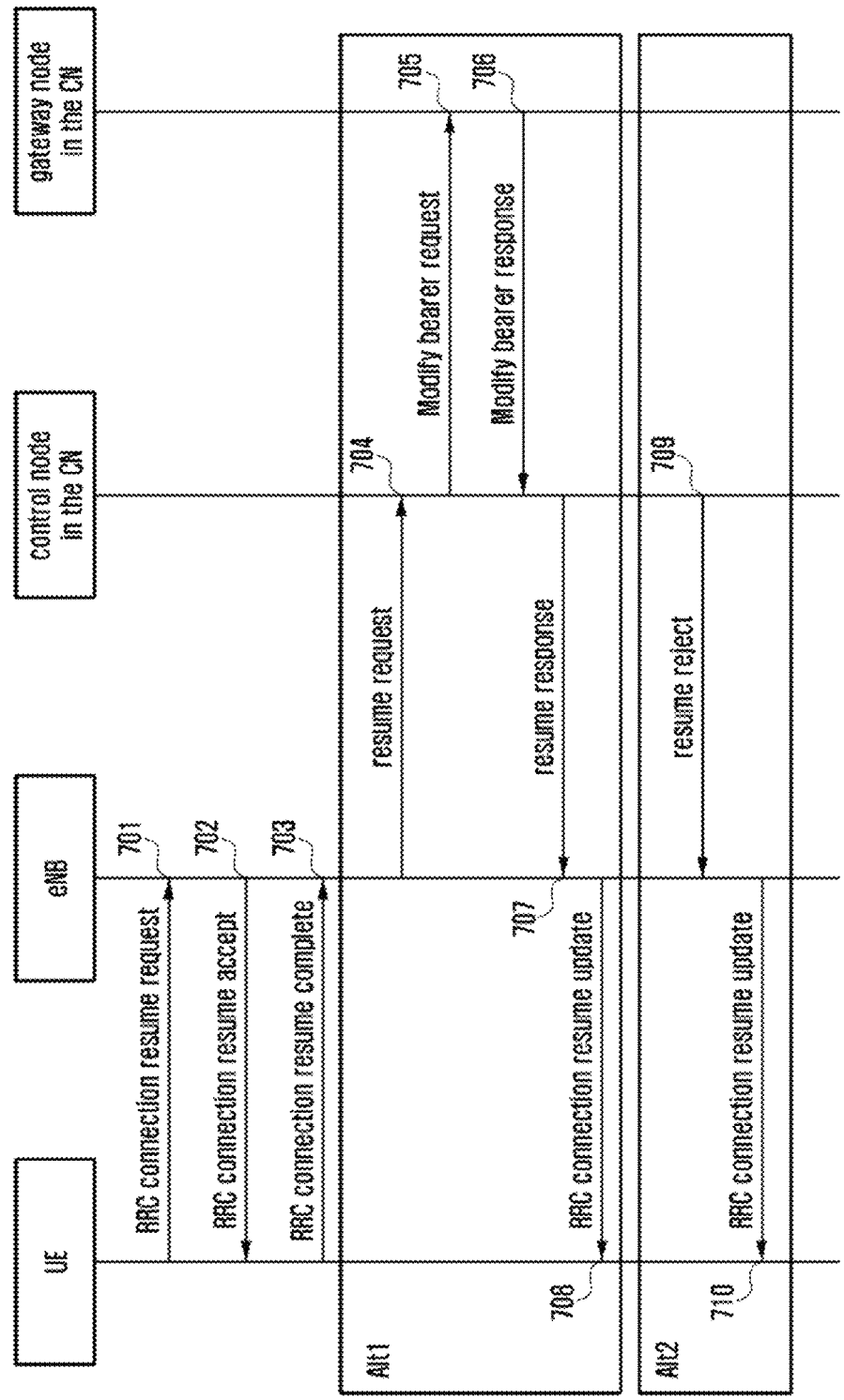
FIG. 7 is a flow chart illustrating how to control UE context and UE connection, in accordance with a first method embodiment of the present disclosure.

FIG. 7 is a flow chart illustrating how to control UE context and UE connection, in accordance with a first method embodiment of the present disclosure. In the embodiment, suppose previous UE connection and previous UE context have been suspended, the method may include the following blocks.

In block 701, a UE transmits an RRC connection resume request to an eNB. The RRC connection resume request may be carried in an RRC connection reestablishment message, an RRC connection establishment request message or a new RRC message. The foregoing messages may indicate the resume requirement information of the UE. The resume requirement information of the UE may refer to block 201, which will not be repeated here. There may be uplink control-plane data transmission requirements of the UE.

In block 702, the eNB transmits an RRC connection resume accept to the UE. The RRC connection resume accept may be carried in the RRC connection reestablishment message, the RRC connection establishment message or a new RRC message.

In block 703, the UE may transmit RRC connection resume complete to the eNB. The RRC connection resume complete may be carried in the RRC connection reestablishment complete, the RRC connection establishment complete or the new RRC message. The foregoing messages may indicate the resume requirement information of the UE. The resume requirement information of the UE may refer to block 201, which is not repeated here.

In block 704, the eNB transmits a resume request message to the control node in the CN. The resume request can be carried in the resume request message and the initial UE message. The resume request may indicate resume requirement information of the UE. The resume requirement information of the UE may refer to block 201, which is not repeated here.

The control node in the CN determines whether to resume the UE connection between the eNB and the gateway node in the CN, according to the resume requirement information of the UE. Specific blocks may refer to block 202, which are not repeated here. In some implementations, when determining there are only the control-plane data transmission requirements of the UE, the control node in the CN may not resume the UE bearing context, and the UE connection between the eNB and the gateway node in the CN. That is, the control node in the CN may not trigger a modify bearer request to the gateway node in the CN. When determining there are user-plane data transmission requirements for the UE in addition to the control-plane data transmission requirements (such as the control node in the CN just receives a downlink data notification of the UE), the control node in the CN needs to resume the UE bearer context and the UE connection between the eNB and the gateway node in the CN. When resume is implemented, proceed with blocks 705 to 708, otherwise, proceed with blocks 709 to 710.

In block 705, the control node in the CN determines to resume the user-plane UE connection, and transmits a modify bearer request message to the gateway node in the CN. The modify bearer request message indicates the transport layer address and TED of the UE bearer in the eNB.

In block 706, the control node in the CN receives a modify bearer response message from the gateway node in the CN.

In block 707, the control node in the CN transmits a resume response to the eNB. The resume response may be carried in the resume response message of the UE, an initial context establishment request message, a downlink NAS transport message. The resume response includes resume instruction information associated with the UE, which may refer to block 202. In some implementations, the message may indicate to resume the UE bearer context or the UE context. Alternatively, Block 707 may be executed before block 705.

In block 708, the eNB executes corresponding operations based on the received UE context resume instruction, which has been described in block 302, and is not repeated here. When the UE context indicated by the resume response is inconsistent with the UE context previously resumed by the RRC, the eNB transmits an RRC connection resume update to the UE. The RRC connection resume update can be carried in the RRC connection resume update message or RRC connection reconfiguration message. The RRC connection resume update includes resume instruction information associated with the UE, which has been described in block 202. In some implementations, the message may indicate to resume the UE bearer context or the UE context. The UE executes corresponding operations according to the received UE context resume instruction, which have been described in block 402 and are not repeated here. Thus, the flow chart may be terminated.

In block 709, when it is not necessary to resume the user plane of the UE or the UE context cannot be searched out, the control node in the CN transmits a resume refuse to the eNB. The resume refuse may be carried by the resume reject message, resume response message, initial context setup request message, downlink NAS transport message, UE context release. The UE context resume refuse may include the resume instruction information associated with the UE, which has been described in block 202. In some implementations, the message may indicate not to resume or refuse to resume the UE context or the UE bearer context.

In block 710, the eNB executes corresponding operations based on the received UE context resume instruction, which has been described in block 302 and is not repeated here. When the UE context indicated by the resume refuse is inconsistent with the UE context previously resumed by the RRC, the eNB transmits an RRC connection resume update to the UE. The RRC connection resume update may be included carried in the RRC connection resume update message or RRC connection reconfiguration message. The message may include resume instruction information associated with the UE, which has been described in block 202. In some implementations, the message may indicate not to resume the UE bearer context or the UE context. Alternatively, the message may indicate to refuse to resume the UE bearer context or the UE context. The UE executes corresponding operations according to the received UE context resume instruction, which has been described in block 402 and is not repeated here. Thus, the flow chart is terminated.

Figure 8:
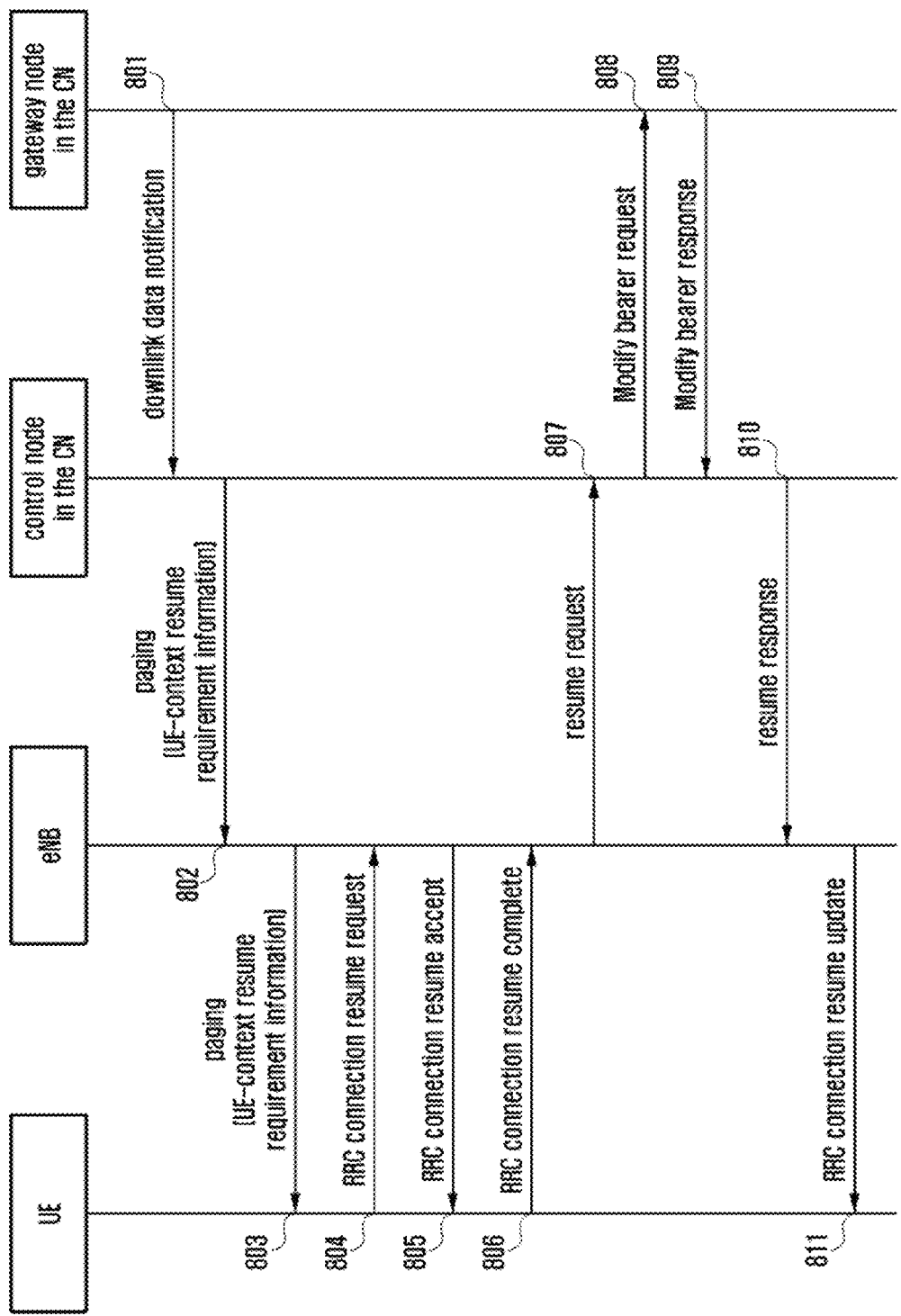
FIG. 8 is a flow chart illustrating how to control UE context and UE connection, in accordance with a second method embodiment of the present disclosure.

FIG. 8 is a flow chart illustrating how to control UE context and UE connection, in accordance with a second method embodiment of the present disclosure. In the embodiment, suppose previous UE connection and UE context are suspended, the method may include the following blocks.

In block 801, a control node in a CN receives a downlink data notification from a gateway node of the CN.

In block 802, the control node in the CN learns a related UE is in an idle state, and UE context is suspended. The control node in the CN transmits a paging message of the UE to the eNB. Optionally, the message may include resume requirement information of the UE. The resume requirement information of the UE is described in block 201, which is not repeated here. The eNB can know learn whether the UE context is suspended, by using the first UE identity index in the resume requirement information of the UE. Or, the e NB indexes the suspended UE bearer context, by using the UE bearer information in the resume requirement information about the UE; the eNB can learn there are UE data transmission requirements with the paging message. When the UE accesses the eNB, the eNB can replace the UE to transmit UE context/UE connection resume request to the control node in the CN, requesting to resume the UE context/UE connection or requesting to resume user-plane UE context/user-plane UE connection. Specific operations are described in block 501, which are not repeated here.

In block 803, the eNB transmits the paging message to the UE. The message may include the resume requirement information of the UE. The UE obtains the resume requirement information of the UE, and determines whether request to resume the UE context/UE connection, as described in block 601.

Figure 9:
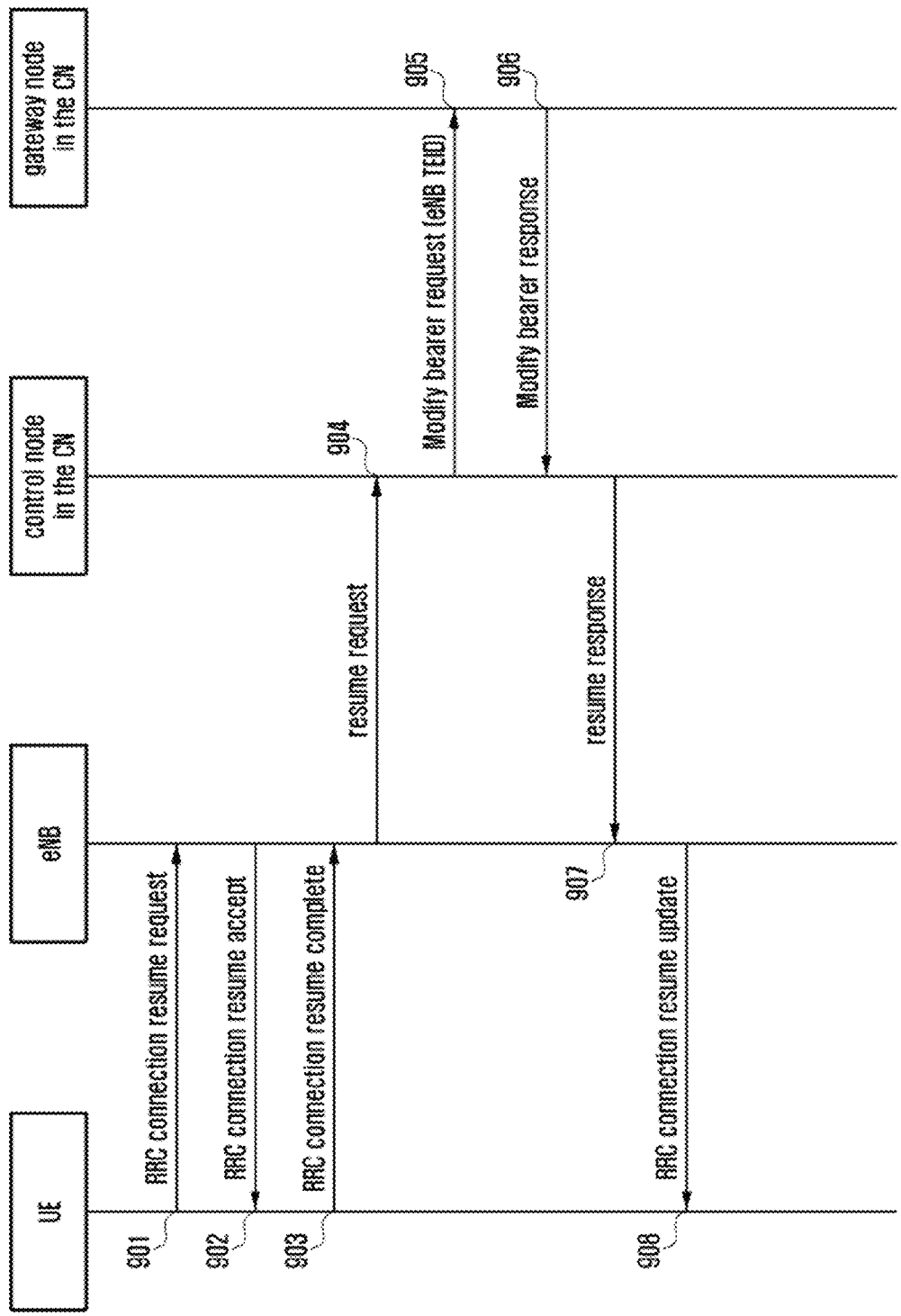
FIG. 9 is a flow chart illustrating how to control UE context and UE connection, in accordance with a third method embodiment of the present disclosure.

Blocks 804 to 811 are the same as blocks 701 to 708, which are not repeated here FIG. 9 is a flow chart illustrating how to control UE context and UE connection, in accordance with a third method embodiment of the present disclosure. In the embodiment, suppose previous UE connection and UE context have been suspended, the method may include the following blocks.

In block 901, a UE transmits an RRC connection resume request to an eNB. Optionally, the RRC connection resume request may be carried by an RRC connection reestablishment message, an RRC connection establishment request message, or a new RRC message. Optionally, the message may indicate the resume requirement information of the UE. The resume requirement information of the UE may refer to block 201, which is not repeated here. In some implementations, when there are uplink control-plane data transmission requirements of the UE with subsequent user-plane data transmission requirements, or when the UE has user-plane data transmission requirements, the UE indicates the resume requirement information of the UE in the message. In addition, the data transmission mode is the user plane bearer.

In block 902, the eNB transmits an RRC connection resume accept to the UE. Optionally, the RRC connection resume accept may be carried in an RRC connection reestablishment message, an RRC connection establishment message or a new RRC message.

In block 903, the UE transmits RRC connection resume complete to the eNB. Optionally, the RRC connection resume complete may be carried in the RRC connection reestablishment complete, an RRC connection establishment complete or a new RRC message. Optionally, the message indicates the resume requirement information of the UE. The resume requirement information of the UE may refer to block 201, which is not repeated here.

In block 904, the eNB transmits a resume request to the control node in the CN. Optionally, the resume request indicates the resume requirement information of the UE. The resume requirement information of the UE may refer to block 201, which is not repeated here.

The control node in the CN determines whether to resume the UE connection between the eNB and the gateway node in the CN, based on the resume requirement information of the UE, which has been described in block 202 and is not repeated. In some implementations, the control node in the CN determines whether to recover the UE connection between the eNB and the gateway node in the CN, based on the resume requirement information of the UE, which has been described in block 202 and is not repeated. The control node in the CN determines there are user-plane data transmission requirements for the UE, in addition to the control-plane data transmission requirements (e.g., the control node in the CN just receives a downlink data notification of the UE, or the UE indicates there are subsequent user-plane data transmission requirements), or there are only the user-plane data transmission requirements. In addition, the data transmission mode is the user plane. It is necessary to resume the UE bearer context, and the UE connection between the eNB and the gateway node in the CN.

Blocks 905 to 908 are the same as blocks 705 to 708, which are not repeated here.

Figure 10:
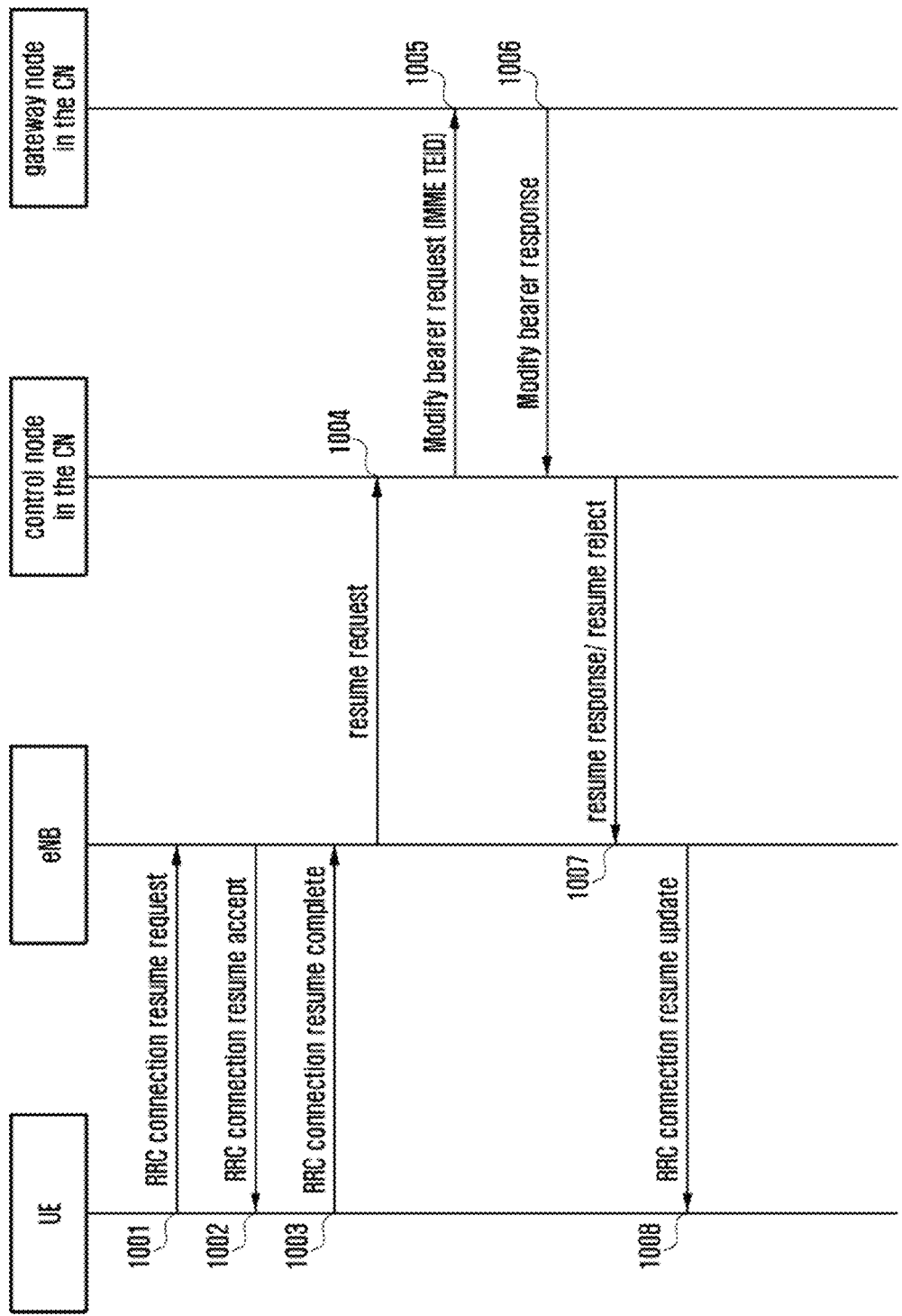
FIG. 10 is a flow chart illustrating how to control UE context and UE connection, in accordance with a fourth method embodiment of the present disclosure.

FIG. 10 is a flow chart illustrating how to control UE context and UE connection, in accordance with a fourth embodiment of the present disclosure. In the embodiment, suppose previous UE connection and UE context are suspended, the method may include the following blocks.

In block 1001, a UE transmits an RRC connection resume request to an eNB. Optionally, the RRC connection resume request may be carried in an RRC connection reestablishment message, an RRC connection establishment request message, or a new RRC message. Optionally, the message indicates the resume requirement information of the UE. The resume requirement information of the UE may refer to block 201, which is not repeated here. In some implementations, when there are uplink control-plane data transmission requirements of the UE, accompanying with subsequent user-plane data transmission requirements of the UE, or when the UE has user- plane data transmission requirements, the message indicates the resume requirement information of the UE. In addition, the data transmission mode is the control plane.

In block 1002, the eNB transmits an RRC connection resume accept to the UE. Optionally, the RRC connection resume accept may be carried in the RRC connection reestablishment message, the RRC connection establishment message, or new RRC message.

In block 1003, optionally, the UE transmits RRC connection resume complete to the eNB. Optionally, the RRC connection resume complete may be carried in the RRC connection reestablishment complete message, the RRC connection establishment complete message, or the new RRC message. The resume requirement information of the UE may refer to block 201, which is not repeated here.

In block 1004, the eNB transmits a resume request to the control node in the CN. Optionally, the resume request indicates the resume requirement information of the UE. The resume requirement information of the UE may refer to block 201, which is not repeated here.

The control node in the CN determines whether to resume the UE connection between the eNB and the gateway node in the CN, based on the resume requirement information of the UE, which has been described in block 202 and is not repeated here. In some implementations, the control node in the CN determines there are user-plane data transmission requirements for the UE, in addition to the control-plane data transmission requirements of the UE (e.g., the control node in the CN just receives a downlink data notification of the UE, or the UE indicates there are subsequent user-plane data transmission requirements), or there are only the user-plane data transmission requirements. In addition, the data transmission mode is the control plane. It is necessary to resume the UE connection between the control node in the CN and the gateway node in the CN. However, it is not necessary to resume the UE bearer context of the eNB.

In block 1005, the control node in the CN determines to resume the user-plane UE connection, and transmits a modify bearer request message to the gateway node in the CN. The modify bearer request message indicates the transport layer address and TEID of the UE bearer in the control node of the CN.

In block 1006, the control node in the CN receives a modify carrier response message from the gateway node in the CN.

In block 1007, the control node in the CN transmits a resume response message or resume reject to the eNB. Optionally, the resume response may be carried by the resume response message, the initial context establishment request message, the downlink NAS transport message. Optionally, the resume reject may be carried by the resume reject message, the initial context establishment request message, the downlink NAS transport message. Optionally, the resume response or resume reject may include the resume instruction information associated with the UE, which has been described in block 202. In some implementations, the message may indicate as follows. Refuse to resume, or, it is not necessary to resume the user-plane UE context or the user-plane UE connection. The message may further indicate as follows. Refuse to resume, or it is not necessary to resume the UE bearer context. The UE bearer context has been described in block 202. Block 1007 may also be executed before block 1005.

In block 1008, the eNB executes corresponding operations, based on the received UE context resume instruction, which has been described in block 302 and is not repeated here. Optionally, when the UE context indicated by the resume reject is inconsistent with the UE context previously resumed by the RRC, the eNB transmits an RRC connection resume update to the UE. The RRC connection resume update can be included in the RRC connection resume update message or RRC connection reconfiguration message. The RRC connection resume update includes the resume instruction information associated with the UE, which has been described in block 202. The message may indicate the following contents. Refuse to resume the user-plane UE context or the user-plane UE connection. Or, it is not necessary to resume the user-plane UE context or the user-plane UE connection. The message may further indicate the following contents. Refuse to resume the UE bearer context. Or, it is not necessary to resume the UE bearer context. The UE bearer context has been described in block 202.

The UE executes corresponding operation, based on the received UE context resume instruction, which is described in block 402 and is not repeated here.

Figure 11:
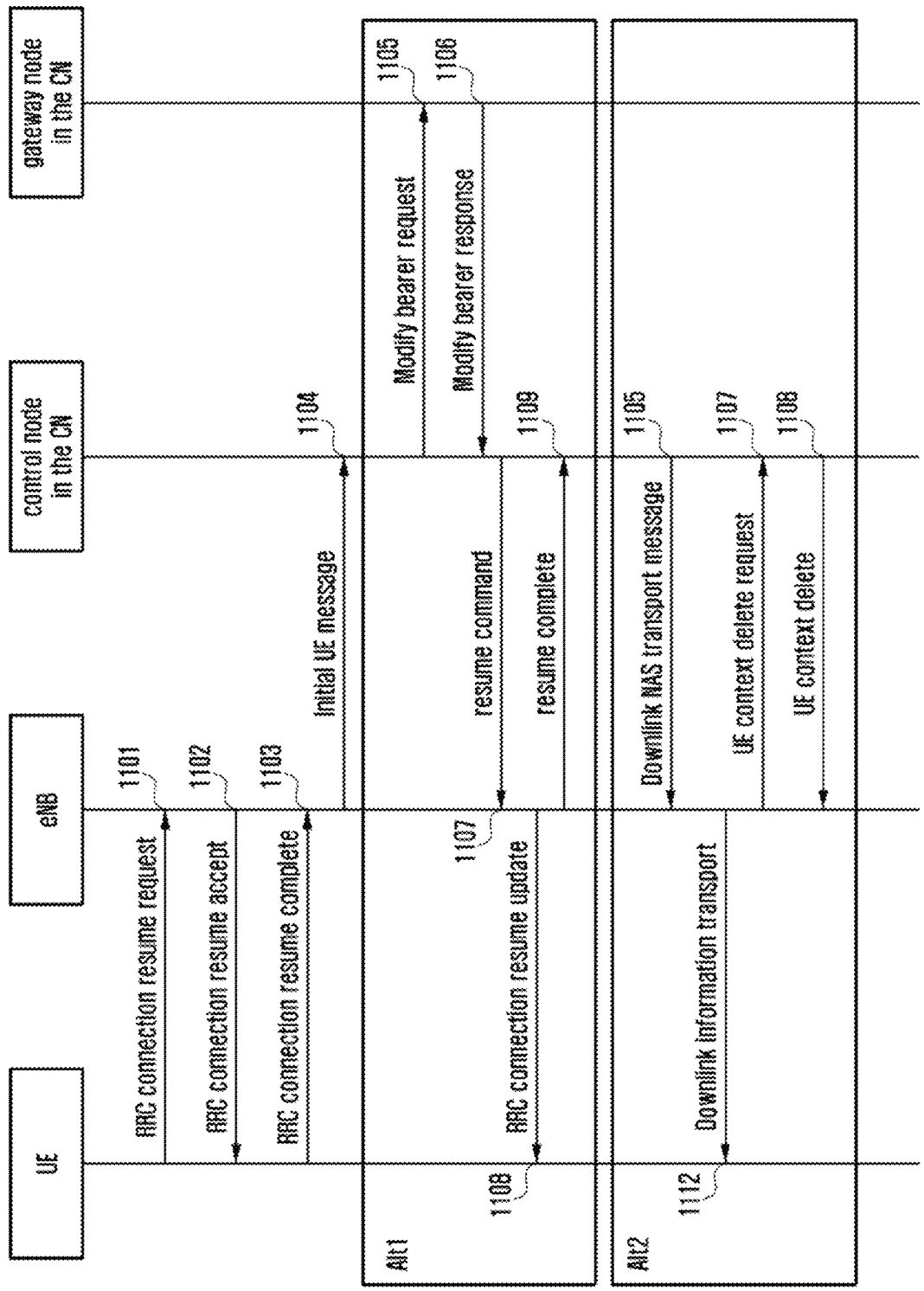
FIG. 11 is a flow chart illustrating how to control UE context and UE connection, in accordance with a fifth method embodiment of the present disclosure.

FIG. 11 is a flow chart illustrating how to control UE context and UE connection, in accordance with a fifth method embodiment of the present disclosure. In the embodiment, suppose previous UE connection and UE context are suspended, the method may include the following blocks.

In block 1101, in some implementations, there are only control-plane data transmission requirements of a UE. The UE transmits an RRC connection resume request to an eNB. Optionally, the RRC connection resume request may be carried in the RRC connection reestablishment message, the RRC connection establishment request message or the new RRC message. Optionally, the message indicates the resume requirement information of the UE. The resume requirement information of the UE has been described in block 201, which is not repeated here.

In block 1102, the eNB transmits an RRC connection resume accept to the UE. Optionally, the RRC connection resume accept may be carried by the RRC connection reestablishment message, the RRC connection establishment message or the new RRC message.

In block 1103, optionally, the UE may transmit an RRC connection resume complete to the eNB. Optionally, the RRC connection resume complete may be carried by the RRC connection reestablishment complete, the RRC connection establishment complete, or the new RRC message. The resume requirement information of the UE has been described in block 201, which is not repeated here.

In block 1104, the eNB transmits an initial UE message to the control node in the CN. Optionally, the initial UE message may indicate the resume requirement information of the UE. The resume requirement information of the UE has been described in block 201, which is not repeated here.

Optionally, the initial UE message may include the second UE identity, that is, the UE identity of the eNB side of the new UE context, e.g., eNB UE S1AP ID or the UE identity with the suspended UE context. If the initial UE message includes the UE identity of the new UE context, when determining to resume the suspended UE context, the control node in the CN indicates the second UE identity, and requests the eNB to delete the UE context associated with the second UE identity; when determining to newly establish UE context for the UE, the control node in the CN assigns a new UE identity at the eNB side, such as MME UE S1AP ID.

The control node in the CN determines whether to resume the UE connection between the eNB and the gateway node in the CN, based on the resume requirement information of the UE, which has been described in block 202 and is not repeated here. In some implementations, when determining there are only the control-plane data transmission requirements for the UE, the control node in the CN establishes a new UE context, instead of resuming the UE bearer context and the UE connection between the eNB and the gateway node in the CN. In some other implementations, when determining there are user-plane data transmission requirements for the UE, in addition to the control-plane data transmission requirements (e.g., the control node in the CN just receives a downlink data notification of the UE), the control node in the CN needs to resume the UE bearer context and the UE connection between the eNB and the gateway node in the CN.

When needing to resume the UE bearer context and the UE connection between the eNB and the gateway node in the CN, proceed with blocks 1105 to 1109; when it is not necessary to resume the UE bearer context and the UE connection between the eNB and the gateway node in the CN, proceed with blocks 1110 to 1113.

In block 1105, the control node in the CN determines to resume the user-plane UE connection, and transmits a modify bearer request message to the gateway node in the CN. The modify bearer request message indicates the transport layer address and TED of the UE bearer at the eNB side.

In block 1106, the control node in the CN receives a modify bearer response message from the gateway node in the CN.

In block 1107, the control node in the CN transmits a resume command to the eNB. Optionally, the resume command includes the resume instruction information associated with the UE, which has been described in block 202. In some implementations, the message may indicate to resume the UE context or the UE bearer context. Optionally, the message may include the eNB-side UE identity assigned by the eNB, which means as follows. The control node in the CN requests the eNB to delete the UE context related with the UE identity. Block 1107 may be executed before block 1105.

In block 1108, the eNB executes corresponding operations based on the received UE context resume instruction, which has been described in block 302 and is not repeated here. Optionally, when the UE context indicated by the resume instruction is inconsistent with the UE context previously resumed by the RRC, the eNB transmits an RRC connection resume update to the UE. Optionally, the RRC connection resume update may be carried by the RRC connection resume update message or RRC connection reconfiguration message. Optionally, the message may include the resume instruction information associated with the UE, which has been described in block 202. In some implementations, the message may indicate to resume the UE context or the UE bearer context. The UE executes corresponding operations, based on the received UE context resume instruction, which has been described in block 402 and is not repeated here.

In block 1109, the eNB returns a resume complete to the control node in the CN.

In block 1110, the control node in the CN transmits a downlink NAS transport message to the eNB, in which the downlink NAS transport message includes a NAS data packet. In some implementations, the message may indicate not to resume, or refuse to resume, or keep suspending the UE context or the UE bearer context.

In block 1111, the eNB transmits the NAS data packet to the UE with a downlink information transport message. In some implementations, the downlink information transport message may indicate not to resume, or refuse to resume, or keep suspending the UE context or the UE bearer context.

In block 1112, the transmission of the NAS data packet is completed. The UE is no longer active. The eNB transmits a UE context delete request to the control node in the CN, indicates the newly assigned identity of the UE context (e.g., eNB UE S1AP ID, MME UE S1AP ID), and requests the control node in the CN to delete the UE context associated with the identity.

In block 1113, the control node in the CN deletes the related UE context, and returns a UE context delete response to the eNB. The eNB then releases the UE connection.

Until now, the flowchart illustrated in FIG. 11 is terminated.

Figure 12:
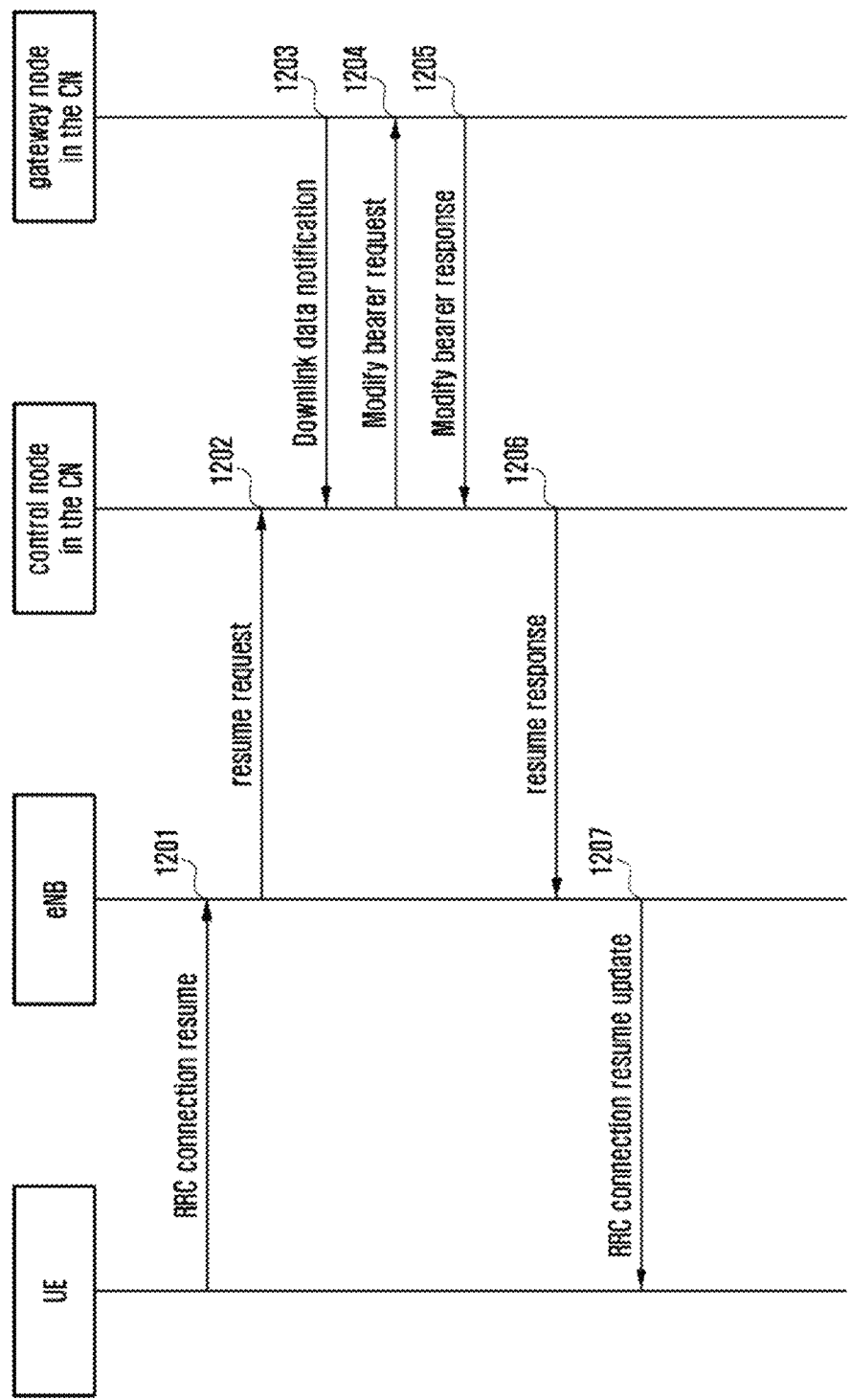
FIG. 12 is a flow chart illustrating how to control UE context and UE connection, in accordance with a sixth method embodiment of the present disclosure.

FIG. 12 is a flow chart illustrating how to control UE context and UE connection, in accordance with a sixth method embodiment of the present disclosure. In the embodiment, suppose previous UE connection and UE context are suspended, the method may include the following blocks.

In block 1201, an RRC connection between a UE and an eNB is resumed. Optionally, the UE may transmit resume requirement information of the UE to the eNB. The resume requirement information of the UE may refer to block 201, which is not repeated here. In some implementations, the eNB learns that there are only the control-plane data transmission requirements for the UE, based on the resume requirement information of the UE. And then, the eNB does not resume, or continues suspending the user-plane UE context and the user-plane UE connection.

In block 1202, the eNB transmits a resume request message to the control node in the CN. Optionally, the resume request message may indicate the resume requirement information of the UE. The resume requirement information of the UE may refer to block 201, which is not repeated here.

The control node in the CN learns that there are only the control-plane data transmission requirements for the UE, based on the resume requirement information of the UE transmitted by the eNB.

In block 1203, in the meantime, the control node in the CN just receives the resume requirement information of the UE from the gateway node in the CN, and learns that there is downlink user-plane UE data. The control node in the CN determines to resume the user-plane UE context and the user-plane UE connection, that is, the UE connection between the eNB and the gateway node in the CN, which has been described in block 202 and is not repeated here.

In block 1204, the control node in the CN transmits a modify bearer request message to the gateway node in the CN. The modify bearer request message indicates the transport layer address and TED of the UE bearer in the eNB.

In block 1205, the control node in the CN receives a modify bearer response message from the gateway node in the CN.

In block 1206, the control node in the CN transmits a resume response message to the eNB. Optionally, the resume response message may include the resume instruction information associated with the UE. In some implementations, the resume instruction information associated with the UE may indicate to resume the user-plane UE context or the user-plane UE connection. The resume instruction information associated with the UE may further specify the UE bearer context to be resumed. The UE bearer context information has been described in block 201. Block 1206 may be executed before block 1204.

In block 1207, the eNB executes corresponding operations based on the received UE context resume instruction, which has been described in block 302 and is not repeated here. Optionally, when the UE context indicated by the resume command is inconsistent with the UE context previously resumed by the RRC, the eNB transmits an RRC connection resume update to the UE. Optionally, the RRC connection resume update may be carried by the RRC connection resume update message or RRC connection reconfiguration message. Optionally, the message may include the resume instruction information associated with the UE, which has been described in block 202. Until now, the flowchart illustrated with FIG. 12 is terminated.

Figure 13:
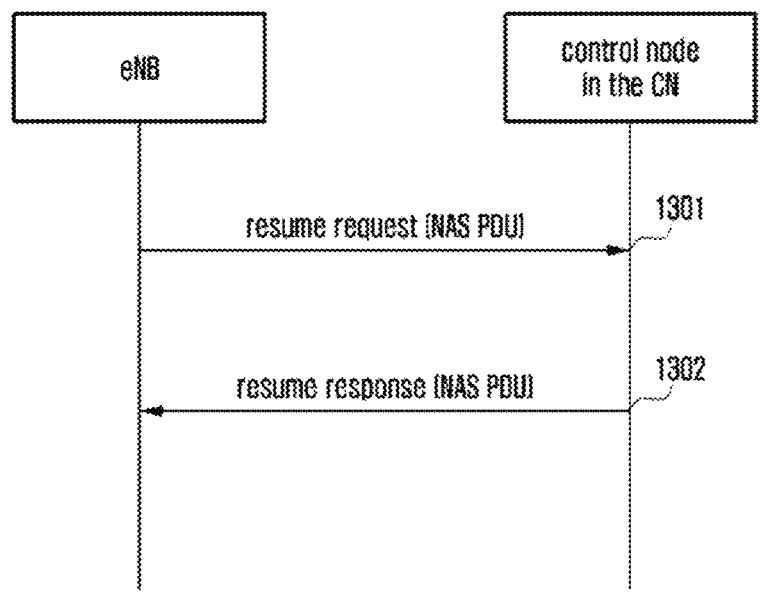
FIG. 13 is a flow chart illustrating how to control UE context and UE connection, in accordance with a seventh method embodiment of the present disclosure.

FIG. 13 is a flow chart illustrating how to control UE context and UE connection, in accordance with a seventh method embodiment of the present disclosure. In the embodiment, the NAS PDU has been added during the resume process, so as to save the signaling needed when transmitting the control-plane signaling. The method may include the following blocks.

In block 1301, during the process of transmitting by an eNB a resume request to a control node in a CN, after receiving control-plane data of a UE, the control-plane data of the UE may be transmitted to the control node in the CN with the resume request. On one hand, signaling overheads for transmitting the control-plane data may be saved. On the other hand, transmit the resume requirement information of the UE to the control node in the CN.

In block 1302, during the process of transmitting by the control node in the CN a resume response to the eNB, when there is control-plane data destined for the UE, the control-plane data may be transmitted to the eNB with the resume response, so as to save the signaling overheads for transmitting the control-plane data.

Based on foregoing technical solution, it can be seen that after distinguishing scenarios with different data transmission requirements, resume or newly establish the UE context or UE connection based on requirements, overheads of signaling resource may be effectively reduced. Meanwhile, resource utilization may be improved. And favorable conditions for accessing by a huge number of IOTUEs may be created.

Figure 14:
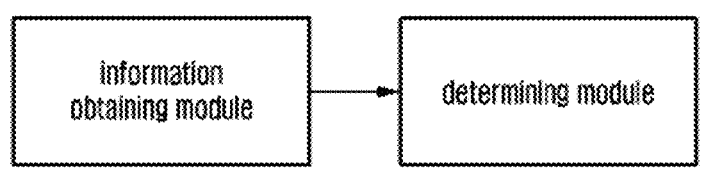
FIG. 14 is a schematic diagram illustrating structure of a device for controlling UE context and UE connection, in accordance with an embodiment of the present disclosure.

Corresponding to the foregoing method, the present disclosure also provides a device for controlling the UE context and UE connection. Structure of the device may refer to FIG. 14. The device includes an information obtaining module and a determining module.

The information obtaining module is to obtain resume requirement information of the UE.

The determining module is to determine whether to resume the UE context, and/or, UE connection, based on the resume requirement information of the UE.

The foregoing is only preferred embodiments of the present disclosure, which is not for use in limiting the present disclosure. Any modifications, equivalent substitutions and improvements made within the spirit and principles of the present disclosure, should be covered by the protection scope of the present disclosure.

What is claimed is:

1. A method performed by a core network node for handling a control plane in a mobile communication system, the method comprising:
receiving, from a terminal, a first message including first information indicating whether the terminal supports a transmission of user data over a control plane connection;
transmitting, to the terminal, a second message including second information indicating whether the core network node accepts the transmission of user data over the control plane connection, as a response to the first message; and
transmitting, to the terminal, user data over the control plane connection,
wherein the user data is included in a payload of a non-access stratum (NAS) message.

2. The method of claim 1, wherein the first message includes a message to request a registration of the terminal and the second message includes a message to accept the registration of the terminal.

3. The method of claim 1, wherein a user plane connection for the transmission of user data is not established.

4. The method of claim 1, further comprising determining whether the core network node and the terminal only use the control plane connection without an establishment of a user plane connection, based on the first information.

5. The method of claim 1, wherein the user data is forwarded from the core network node for handling a user plane to the terminal.

6. A core network node for handling a control plane in a mobile communication system, the core network node comprising:

a transceiver configured to transmit and receive a signal; and
a controller coupled with the transceiver and configured to:
receive, from a terminal, a first message including first information indicating whether the terminal supports a transmission of user data over a control plane connection,
transmit, to the terminal, a second message including second information indicating whether the core network node accepts the transmission of user data over the control plane connection, as a response to the first message, and
transmit, to the terminal, user data over the control plane connection,
wherein the user data is included in a payload of a non-access stratum (NAS) message.

7. The core network node of claim 6, wherein the first message includes a message to request a registration of the terminal and the second message includes a message to accept the registration of the terminal.

8. The core network node of claim 6, wherein a user plane connection for the transmission of user data is not established.

9. The core network node of claim 6, wherein the controller is further configured to determine whether the core network node and the terminal only use the control plane connection without an establishment of a user plane connection, based on the first information.

10. The core network node of claim 6, wherein the user data is forwarded from the core network node for handling a user plane to the terminal.

11. A method performed by a terminal in a mobile communication system, the method comprising:
transmitting, to a core network node for handling a control plane, a first message including first information indicating whether the terminal supports a transmission of user data over a control plane connection;
receiving, from the core network node, a second message including second information indicating whether the core network node accepts the transmission of user data over the control plane connection, as a response to the first message; and
receiving, from the core network node, user data over the control plane connection,
wherein the user data is included in a payload of a non-access stratum (NAS) message.

12. The method of claim 11, wherein the first message includes a message to request a registration of the terminal and the second message includes a message to accept the registration of the terminal,
wherein a user plane connection for the transmission of user data is not established,
wherein whether the core network node and the terminal only use the control plane connection without an establishment of the user plane connection is determined by the core network node, based on the first information, and
wherein the user data is forwarded from the core network node for handling a user plane.

13. A terminal in a mobile communication system, the terminal comprising:
a transceiver configured to transmit and receive a signal; and
a controller coupled with the transceiver and configured to:
transmit, to a core network node for handling a control plane, a first message including first information indicating whether the terminal supports a transmission of user data over a control plane connection,
receive, from the core network node, a second message including second information indicating whether the core network node accepts the transmission of user data over the control plane connection, as a response to the first message, and
receive, from the core network node, user data over the control plane connection,
wherein the user data is included in a payload of a non-access stratum (NAS) message.

14. The terminal of claim 13, wherein the first message includes a message to request a registration of the terminal and the second message includes a message to accept the registration of the terminal,
wherein a user plane connection for the transmission of user data is not established, and
wherein whether the core network node and the terminal only use the control plane connection without an establishment of the user plane connection is determined by the core network node, based on the first information.

15. The terminal according to claim 13, wherein the user data is forwarded from the core network node for handling a user plane.

* * * * *

UNITED STATES PATENT AND TRADEMARK OFFICE
CERTIFICATE OF CORRECTION

PATENT NO. : 11,582,824 B2
APPLICATION NO. : 17/228570
DATED : February 14, 2023
INVENTOR(S) : Lixiang Xu et al.

Page 1 of 1

It is certified that error appears in the above-identified patent and that said Letters Patent is hereby corrected as shown below:

On the Title Page

Column 1, after Item (63) and before Item (51), add new Item (30) as shown below:
-- (30) Foreign Application Priority Data
Jan. 8, 2016 (CN) .................... 201610013623.1 --.

Signed and Sealed this
Twenty-fourth Day of September, 2024

Katherine Kelly Vidal
*Director of the United States Patent and Trademark Office*